(12) United States Patent
Scales et al.

(10) Patent No.: US 9,815,979 B2
(45) Date of Patent: Nov. 14, 2017

(54) NON-REACTIVE, HYDROPHILIC POLYMERS HAVING TERMINAL SILOXANES AND METHODS FOR MAKING AND USING THE SAME

(71) Applicant: Johnson & Johnson Vision Care, Inc., Jacksonville, FL (US)

(72) Inventors: Charles Scales, St. Augustine, FL (US); Kunisi Venkatasubban, Jacksonville, FL (US); Shivkumar Mahadevan, Jacksonville, FL (US); Zohra Fadli, Jacksonville, FL (US); Brent Matthew Healy, Jacksonville Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 15/343,663

(22) Filed: Nov. 4, 2016

(65) Prior Publication Data

US 2017/0051145 A1 Feb. 23, 2017

Related U.S. Application Data

(62) Division of application No. 13/100,473, filed on May 4, 2011, now Pat. No. 9,522,980.

(60) Provisional application No. 61/332,059, filed on May 6, 2010.

(51) Int. Cl.
*G02B 1/04* (2006.01)
*C08L 51/08* (2006.01)
*C08F 290/06* (2006.01)
*C08F 293/00* (2006.01)
*C08G 77/442* (2006.01)
*G02C 7/04* (2006.01)

(52) U.S. Cl.
CPC ........ *C08L 51/085* (2013.01); *C08F 290/068* (2013.01); *C08F 293/005* (2013.01); *C08G 77/442* (2013.01); *C08L 51/08* (2013.01); *G02B 1/043* (2013.01); *G02C 7/049* (2013.01); *G02B 1/04* (2013.01)

(58) Field of Classification Search
CPC ...................................................... G02B 1/04
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,808,178 A | 4/1974 | Gaylord |
| 4,018,853 A | 4/1977 | Le Boeuf et al. |
| 4,113,224 A | 9/1978 | Clark et al. |
| 4,120,570 A | 10/1978 | Gaylord |
| 4,136,250 A | 1/1979 | Mueller et al. |
| 4,139,513 A | 2/1979 | Tanaka et al. |
| 4,153,641 A | 5/1979 | Deichert et al. |
| 4,168,112 A | 9/1979 | Ellis et al. |
| 4,190,277 A | 2/1980 | England |
| 4,197,266 A | 4/1980 | Clark et al. |
| 4,287,175 A | 9/1981 | Katz |
| 4,321,261 A | 3/1982 | Ellis et al. |
| 4,436,730 A | 3/1984 | Ellis et al. |
| 4,495,313 A | 1/1985 | Larsen |
| 4,557,264 A | 12/1985 | Hinsch |
| 4,663,409 A | 5/1987 | Friends et al. |
| 4,680,336 A | 7/1987 | Larsen et al. |
| 4,740,533 A | 4/1988 | Su et al. |
| 4,889,664 A | 12/1989 | Kindt-Larsen et al. |
| 4,910,277 A | 3/1990 | Bambury et al. |
| 5,006,622 A | 4/1991 | Kunzler et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,177,165 A | 1/1993 | Valint, Jr. et al. |
| 5,219,965 A | 6/1993 | Valint, Jr. et al. |

(Continued)

FOREIGN PATENT DOCUMENTS

| | | |
|---|---|---|
| CN | 101163991 A | 4/2008 |
| CN | 10166334 A | 3/2010 |
| DE | 4143239 A1 | 7/1993 |
| DE | 4337492 C2 | 6/1999 |
| EP | 0080539 B1 | 6/1983 |
| EP | 1803754 A2 | 7/2007 |
| EP | 1918310 A1 | 5/2008 |
| JP | 10512000 | 11/1998 |
| JP | 2009520219 A | 5/2009 |
| JP | 2009175543 A | 8/2009 |

(Continued)

OTHER PUBLICATIONS

Babmann-Schnitzler et al, Sorption properties of hydrophobically modified poly(acrylic acids) as natural organic matter model substances to pyrene, Colloids and Surfaces A: Physiocochem. Eng. Aspects 260 (2005) 119-128.

Bannister, et al, "Development of Branching in Living Radical Copolymerization of Vinyl and Divinyl Monomers", Macromolecules 2006, vol. 39, pp. 7483-7492.

Burchard, "Particle Scattering Factors of Some Branched Polymers", Macromolecules 1977, vol. 10, No. 5, pp. 919-927.

(Continued)

*Primary Examiner* — Michael Pepitone
(74) *Attorney, Agent, or Firm* — Raef M. Shaltout

(57) ABSTRACT

The present invention relates to compositions comprising at least one stable, near-monodisperse, non-reactive hydrophilic polymer comprising in said polymer's backbone, a hydrophilic segment having a degree of polymerization of about 10 to about 1000, and a linear silicone segment at at least one terminal end of said non-reactive hydrophilic polymer, wherein said silicone segment comprises between about 6 and about 200 siloxy units, and said non-reactive hydrophilic polymer is associated, via the linear silicone block with a silicone hydrogel. The non-reactive hydrophilic polymers may be incorporated into the formulation from which the silicone hydrogel is made or may be contacted with the silicone hydrogel post formation.

20 Claims, 3 Drawing Sheets

(56) References Cited

U.S. PATENT DOCUMENTS

| | | |
|---|---|---|
| 5,244,981 A | 9/1993 | Seidner et al. |
| 5,256,751 A | 10/1993 | Vanderlaan |
| 5,260,000 A | 11/1993 | Nandu et al. |
| 5,311,223 A | 5/1994 | Vanderlaan |
| 5,314,960 A | 5/1994 | Spinelli et al. |
| 5,319,589 A | 6/1994 | Yamagata et al. |
| 5,321,108 A | 6/1994 | Kunzler et al. |
| 5,331,067 A | 7/1994 | Seidner et al. |
| 5,352,714 A | 10/1994 | Lai et al. |
| 5,371,147 A | 12/1994 | Spinelli et al. |
| 5,385,996 A | 1/1995 | Rizzardo et al. |
| 5,387,662 A | 2/1995 | Kunzler et al. |
| 5,451,617 A | 9/1995 | Lai et al. |
| 5,525,691 A | 6/1996 | Valint, Jr. et al. |
| 5,539,016 A | 7/1996 | Kunzler et al. |
| 5,700,559 A | 12/1997 | Sheu et al. |
| 5,723,255 A | 3/1998 | Texter et al. |
| 5,760,100 A | 6/1998 | Nicolson et al. |
| 5,805,264 A | 9/1998 | Janssen et al. |
| 5,874,511 A | 2/1999 | Rizzardo et al. |
| 5,942,558 A | 8/1999 | Korb |
| 5,944,853 A | 8/1999 | Molock et al. |
| 5,962,548 A | 10/1999 | Vanderlaan et al. |
| 5,998,498 A | 12/1999 | Vanderlaan et al. |
| 6,020,445 A | 2/2000 | Vanderlaan et al. |
| 6,087,412 A | 7/2000 | Chabrecek et al. |
| 6,087,415 A | 7/2000 | Vanderlaan et al. |
| 6,099,852 A | 8/2000 | Jen |
| 6,277,365 B1 | 8/2001 | Ellis et al. |
| 6,367,929 B1 | 4/2002 | Maiden et al. |
| 6,428,839 B1 | 8/2002 | Kunzler et al. |
| 6,433,061 B1 | 8/2002 | Marchant et al. |
| 6,458,142 B1 | 10/2002 | Faller et al. |
| 6,637,929 B2 | 10/2003 | Baron |
| 6,794,486 B2 | 9/2004 | Adam et al. |
| 6,822,016 B2 | 11/2004 | McCabe et al. |
| 6,858,310 B2 | 2/2005 | McGee et al. |
| 6,867,245 B2 | 3/2005 | Iwata et al. |
| 7,109,276 B2 | 9/2006 | Wilczewska et al. |
| 7,553,880 B2 | 6/2009 | Nicolson et al. |
| 7,566,746 B2 | 7/2009 | Winterton et al. |
| 7,592,341 B2 | 9/2009 | Tomich et al. |
| 7,705,067 B2 | 4/2010 | Winterton et al. |
| 7,786,185 B2 | 8/2010 | Rathore et al. |
| 7,807,755 B2 | 10/2010 | Farnham et al. |
| 7,816,454 B2 | 10/2010 | Higashira et al. |
| 7,816,464 B2 | 10/2010 | Farcet |
| 7,841,716 B2 | 11/2010 | McCabe et al. |
| 8,158,695 B2 | 4/2012 | Vanderlaan et al. |
| 8,273,366 B2 | 9/2012 | Chauhan et al. |
| 8,337,551 B2 | 12/2012 | Linhardt et al. |
| 9,125,808 B2 | 9/2015 | Alli et al. |
| 9,170,349 B2 | 10/2015 | Mahadevan et al. |
| 2002/0016383 A1 | 2/2002 | Iwata et al. |
| 2003/0125498 A1 | 7/2003 | McCabe et al. |
| 2003/0162862 A1 | 8/2003 | McCabe et al. |
| 2004/0116310 A1 | 6/2004 | Kunzler et al. |
| 2004/0208983 A1 | 10/2004 | Hill et al. |
| 2005/0031793 A1 | 2/2005 | Moeller et al. |
| 2005/0085561 A1 | 4/2005 | Phelan et al. |
| 2005/0176911 A1 | 8/2005 | Zanini et al. |
| 2005/0192610 A1 | 9/2005 | Houser et al. |
| 2005/0208102 A1 | 9/2005 | Schultz |
| 2006/0063852 A1 | 3/2006 | Iwata et al. |
| 2006/0072069 A1 | 4/2006 | Laredo et al. |
| 2006/0187410 A1 | 8/2006 | Sato et al. |
| 2007/0116740 A1 | 5/2007 | Valint, Jr. et al. |
| 2007/0122540 A1 | 5/2007 | Salamone et al. |
| 2007/0155851 A1 | 7/2007 | Alli et al. |
| 2007/0232783 A1 | 10/2007 | Moad et al. |
| 2008/0045612 A1 | 2/2008 | Rathore et al. |
| 2008/0143957 A1 | 6/2008 | Linhardt et al. |
| 2008/0151236 A1 | 6/2008 | Prince et al. |
| 2008/0174035 A1 | 7/2008 | Winterton |
| 2008/0273168 A1 | 11/2008 | Rathore et al. |
| 2008/0307751 A1 | 12/2008 | Newman et al. |
| 2008/0314767 A1 | 12/2008 | Lai et al. |
| 2009/0029043 A1 | 1/2009 | Rong et al. |
| 2009/0108479 A1 | 4/2009 | Lai et al. |
| 2009/0141236 A1 | 6/2009 | Chen et al. |
| 2009/0142292 A1 | 6/2009 | Blackwell et al. |
| 2009/0168012 A1 | 7/2009 | Linhardt et al. |
| 2009/0169716 A1 | 7/2009 | Linhardt et al. |
| 2009/0171049 A1 | 7/2009 | Linhardt et al. |
| 2009/0171459 A1 | 7/2009 | Linhardt et al. |
| 2009/0173044 A1 | 7/2009 | Linhardt et al. |
| 2009/0176676 A1 | 7/2009 | Hilvert et al. |
| 2009/0186229 A1 | 7/2009 | Muller et al. |
| 2010/0048847 A1 | 2/2010 | Broad |
| 2010/0069522 A1 | 3/2010 | Linhardt et al. |
| 2010/0099829 A1 | 4/2010 | Parakka |
| 2010/0137548 A1 | 6/2010 | Moad et al. |
| 2010/0140114 A1 | 6/2010 | Pruitt et al. |
| 2010/0162661 A1 | 7/2010 | Vanderbilt et al. |
| 2010/0168852 A1 | 7/2010 | Vanderbilt et al. |
| 2010/0168855 A1 | 7/2010 | McGee et al. |
| 2010/0249356 A1 | 9/2010 | Rathore |
| 2010/0296049 A1 | 11/2010 | Justynska et al. |
| 2010/0298446 A1 | 11/2010 | Chang et al. |
| 2010/0315588 A1 | 12/2010 | Nunez et al. |
| 2010/0317809 A1 | 12/2010 | Linhardt et al. |
| 2010/0317816 A1 | 12/2010 | Linhardt et al. |
| 2010/0317817 A1 | 12/2010 | Linhardt et al. |
| 2010/0318185 A1 | 12/2010 | Nunez et al. |
| 2011/0102736 A1 | 5/2011 | Wu et al. |
| 2011/0112267 A1 | 5/2011 | Jakubowski et al. |
| 2011/0166248 A1 | 7/2011 | Hsu et al. |
| 2011/0189291 A1 | 8/2011 | Yang et al. |
| 2011/0230589 A1 | 9/2011 | Maggio et al. |
| 2011/0237766 A1 | 9/2011 | Maggio et al. |
| 2011/0275734 A1 | 11/2011 | Scales et al. |
| 2011/0293522 A1 | 12/2011 | Wang et al. |
| 2012/0026457 A1 | 2/2012 | Qiu et al. |
| 2012/0109613 A1 | 5/2012 | Boyden et al. |
| 2013/0203812 A1 | 8/2013 | Raja et al. |

FOREIGN PATENT DOCUMENTS

| | | |
|---|---|---|
| JP | 2010508902 A | 3/2010 |
| JP | 2011510350 A | 3/2011 |
| JP | 2011518347 A | 6/2011 |
| JP | 2012504182 A | 2/2012 |
| JP | 2012508809 A | 4/2012 |
| JP | 2012522111 A | 9/2012 |
| RU | 2334770 C1 | 9/2008 |
| RU | 2008131301 | 2/2010 |
| TW | 203617 | 4/1993 |
| TW | 200519450 | 6/2005 |
| TW | 200914496 | 4/2009 |
| TW | 201024083 | 7/2010 |
| TW | 201026752 | 7/2010 |
| TW | 201206999 | 2/2012 |
| WO | 9631792 A1 | 10/1996 |
| WO | 9729788 A1 | 8/1997 |
| WO | 0171392 A1 | 9/2001 |
| WO | 03022321 A2 | 3/2003 |
| WO | 03022322 A2 | 3/2003 |
| WO | 2004040337 A1 | 5/2004 |
| WO | 2004056909 A1 | 7/2004 |
| WO | 2006057823 A1 | 6/2006 |
| WO | 2007070653 A2 | 6/2007 |
| WO | 2008061992 A2 | 5/2008 |
| WO | 2008112874 A1 | 9/2008 |
| WO | 2008124093 A1 | 10/2008 |
| WO | 2009085754 A1 | 7/2009 |
| WO | 2009085755 A1 | 7/2009 |
| WO | 2009085759 A1 | 7/2009 |
| WO | 2009089207 A1 | 7/2009 |
| WO | 2009117374 A1 | 9/2009 |
| WO | 2010039653 A1 | 4/2010 |
| WO | 2010056686 A1 | 5/2010 |
| WO | 2010117588 A1 | 10/2010 |
| WO | 2011071791 A1 | 6/2011 |
| WO | 2011140318 A1 | 11/2011 |

(56) References Cited

FOREIGN PATENT DOCUMENTS

| WO | 2012016096 A1 | 2/2012 |
| WO | 2012016098 A1 | 2/2012 |
| WO | 2012015135 A1 | 11/2012 |
| WO | 2012170603 A1 | 12/2012 |
| WO | 2013074535 A1 | 5/2013 |
| WO | 2014093299 A1 | 6/2014 |

OTHER PUBLICATIONS

Burchard, "Solution Properties of Branched Macromolecules", Advances in Polymer Science, 1999, vol. 143, pp. 113-194.

Burchard, et al. "Information on Polydispersity and Branching from Combined Quasi-Elastic and Integrated Scattering", Macromolecules 1980, vol. 13, pp. 1265-1272.

Crivello, et al, Photoinitiators for Free Radical Cationic & Anionic Photopolymerisation, 2nd Edition, vol. III, pp. 275-298, John Wiley and Sons, New York, 1998.

Encyclopedia of Polymer Science and Engineering, N-Vinyl Amide Polymers, Second edition, vol. 17, pp. 198-257, John Wiley & Sons Inc. 1989.

Gao, et al, "Synthesis of functional polymers with controlled architecture by CRP of monomers in the presence of cross-linkers: From stars to gels", Progress in Polymer Science 2009, vol. 34, pp. 317-350.

Huan et al: "Synthesis and Properties of Polydimethylsiloxane-Containing Block Copolymers via Living Radical Polymerization", Journal of Polymer Science: Part A: Polymer Chemistry, vol. 39, 2001; pp. 1833-1842.

ISO 18369-4:2006: Ophthalmic optics—Contact lenses—Part 4: Physicochemical properties of contact lens materials.

ISO 9913-1: 1996: Optics and optical instruments—Contact Lenses—Part 1: Determination of oxygen permeability and transmissibility by the FATT method.

Karunakaran et al, Synthesis, Characterization, and Crosslinking of Methacrylate-Telechelic PDMAAm-b-PDMS-b-PDMAAm Copolymers, Journal of Polymer Science: Part A: Polymer Chemistry, vol. 45, 4284-4290 (2007), Wiley Periodicals, Inc.

Lowe et al: "Reversible addition-fragmentation chain transfer (RAFT) radical polymerization and the synthesis of water-soluble (co)polymers under homogeneous conditions in organic and aqueous media", Prog. Polym. Sci. 32 (2007) 283-351.

McDowall et al: "Synthesis of Seven-Arm Poly(vinyl pyrrolidone) Star Polymers with Lysozyme Core Prepared by MADIX/RAFT Polymerization", Macromolecular Rapid Communication, vol. 29, 2008, pp. 1666-1671.

Mosmann, Rapid Colorimetric Assay for Cellular Growth and Survival: Application to Proliferation and Cytotoxicity Assays, Journal of Immunological Methods, 65 (1983) 55-63.

Pavlovic et al; "Synthesis and characterization of hydrophilic silicone copolymers and macromonomers for opthalmic application", Database accession No. 2008;955522, & Abstracts of Papers, 236th ACS National Meeting, philadelphia, PA, US, Aug. 17-21, 2008, POLY-113 Publisher: American Chemical Society, Washington, DC 2008.

PCT International Preliminary Report on Patentability, dated Nov. 5, 2013, for PCT Int'l Appln. No. PCT/US2012/035722.

PCT International Preliminary Report on Patentability, dated Nov. 25, 2014, for PCT Int'l Appln. No. PCT/US2013/042628.

PCT International Preliminary Report on Patentability, dated Nov. 25, 2014, for PCT Int'l Appln. No. PCT/US2013/042644.

PCT International Preliminary Report on Patentability, dated Nov. 25, 2014, for PCT Int'l Appln. No. PCT/US2013/042658.

PCT International Preliminary Report on Patentability, dated Nov. 15, 2012, for PCT Int'l Appln. No. PCT/US2011/035324.

PCT International Preliminary Report on Patentability, dated Nov. 25, 2014, for PCT/US2013/040066.

PCT International Search Report, dated Mar. 6, 2014, for PCT Int'l Appln No. PCT/US2013/040066.

PCT International Search Report, dated Feb. 26, 2014, for PCT Int'l Appln No. PCT/US2013/042628.

PCT International Search Report, dated May 37, 2014, for PCT Int'l Appln. No. PCT/US2013/042658.

PCT International Search Report, dated Aug. 11, 2011, for PCT Int'l Appln. No. PCT/US2011/035324.

PCT International Search Report, dated Jul. 11, 2012, for PCT Int'l Appln. No. PCT/US2012/035722.

PCT International Search Report, dated Oct. 29, 2013, for PCT Int'l Appln. No. PCT/US2013/042644.

Shedge et al, Hydrophobically Modified Poly(acrylic acid) Using 3-Pentadecylcyclohexylamine: Synthesis and Rheology, Macromolecular Chemistry and Physics 2005, 206, 464-472.

Sugiyama, et al, "Evaluation of biocompatibility of the surface of polyethylene films modified with various water soluble polymers using Ar plasma-post polymerization technique", Macromolecular Materials and Engineering, (2000), 282, 5-12.

Vo, et al, "RAFT Synthesis of Branched Aacrylic Copolymers", Macromolecules 2007, vol. 40, pp. 7119-7125.

Vogt, et al, "Tuning the Temperature Response of Branched Poly(N-isopropylacrylarnide) Prepared by RAFT Polymerization", Macromolecules 2008, vol. 41, pp. 7368-7373.

Wooley, et al, A 'Branched-Monomer Approach' for the Rapid Synthesis of Dendimers**, Angew. Chem, Int. Ed. Engl. 1994, vol. 33, No. 1, pp. 82-85.

A.J. Phillips and J. Stone (Ed.), Contact Lenses. A Textbook for Practitioner and Student. 3rd edition 1989, p. 150.

Extended European Search Report dated Feb. 1, 2017 for Application No. EP 16175519.

Green et al., Material Properties That Predict Preservative Uptake for Silicone Hydrogel Contact Lenses. Eye & Contact Lens 38 (Nov. 2012) 350-357.

J.E. Mark (Ed.), Polymer Data Handbook, Oxford University Press 1999, pp. 961-964.

Maldonado-Godina et al, In vitro water wettability of silicone hydrogel contact lenses determined using the sessile drop and captive bubble techniques. Journal of Biomedical Materials Research Part A 83 (2007) 496-502.

Rosa et al., Hydrosoluble Copolymers of Acrylamide-(2-acrylamido-2-methylpropanesulfonic acid). Synthesis and Characterization by Spectroscopy and Viscometry. Journal of Applied Polymer Science 87 (2003) 192-198.

Saito et al., Synthesis and Hydrophilicity of Multifunctionally Hydroxylated Poly(acrylamides). Macromolecules 1996, 29, 313-319.

Subbaraman et al., Kinetics of in vitro Lysozyme Deposition on Silicone Hydrogel, Group II and Group IV Contact Lens Materi-als. Investigative Ophthalmology & Visual Science 46 (May 2005).

Travas-Sejdic et al, Study of Free-Radical Copolymerization of Acrylamide with 2-Acrylamido-2-methyl-1-propane Sulphonic Acid. Journal of Applied Polymer Science 75 (2000) 619-628.

NON-REACTIVE, HYDROPHILIC POLYMERS HAVING TERMINAL SILOXANES AND METHODS FOR MAKING AND USING THE SAME

RELATED APPLICATIONS

This application is a divisional of U.S. Ser. No. 13/100,473, filed May 4, 2011, now U.S. Pat. No. 9,522,980, issued Dec. 20, 2016, which claims priority to Provisional Patent Application U.S. Ser. No. 61/332,059 which was filed on May 6, 2010, the contents of which are relied upon and incorporated by reference.

FIELD OF THE INVENTION

The present invention relates to hydrophilic polymers having a terminal siloxane containing segment. The hydrophilic polymers may be incorporated into a variety of substrates, including medical devices, to improve the wettability, lubricity and protein uptake thereof.

BACKGROUND OF THE INVENTION

Contact lenses have been used commercially to improve vision since the 1950s. The first contact lenses were made of hard materials. Although these lenses are currently used, they are not widely used due to their poor initial comfort and their relatively low permeability to oxygen. Later developments in the field gave rise to soft contact lenses, based upon hydrogels. Many users find soft lenses are more comfortable, and increased comfort levels allow soft contact lens users to wear their lenses for longer hours than users of hard contact lenses.

Another class of available contact lenses is silicone hydrogel contact lenses. Silicone-containing components are combined with conventional hydrogel components to form silicone hydrogels which display increased oxygen permeability compared to conventional hydrogels. However, some silicone hydrogels display undesirably high contact angles and protein uptake compared to conventional hydrogel lenses.

Various compounds have been disclosed as suitable for treating preformed silicone hydrogel contact lenses including surface active segmented block copolymers, substantially water-soluble silicone-containing surfactants, functionalized hybrid PDMS/polar amphipathic copolymer block systems, including polydimethylsiloxane-PVP block copolymers and (meth)acrylated polyvinylpyrrolidone. There remains a need for methods for improving the properties of contact lenses and particularly silicone hydrogel contact lenses.

SUMMARY OF THE INVENTION

The present invention relates to polymeric articles, in one embodiment ophthalmic devices comprising a silicone, and in one embodiment silicone hydrogel and at least one stable, non-reactive hydrophilic polymer comprising in said polymer's backbone, a hydrophilic segment having a degree of polymerization of about 300 to about 5000, and a linear silicone segment on at least one terminal end of said non-reactive hydrophilic polymer, wherein said silicone segment comprises between about 6 and about 200 siloxy units, wherein said non-reactive hydrophilic polymer is associated, via the linear silicone block, with said silicone hydrogel and provides said ophthalmic device with a reduction in lipid uptake compared to the silicone hydrogel of at least about 20%.

In another embodiment, the present invention relates to compositions comprising at least one stable, non-reactive hydrophilic polymer comprising a hydrophilic segment having a degree of polymerization of about 300 to about 5000 and a linear silicone segment at least one terminal end of said non-reactive hydrophilic polymer, wherein said silicone segment comprises between about 6 and about 200 siloxy units, and said non-reactive hydrophilic polymer is associated, via the linear silicone block with a substrate containing at least one hydrophobic polymeric component or region, such as a silicone-containing polymer, such as a silicone hydrogel.

DETAILED DESCRIPTION

Figure 1:
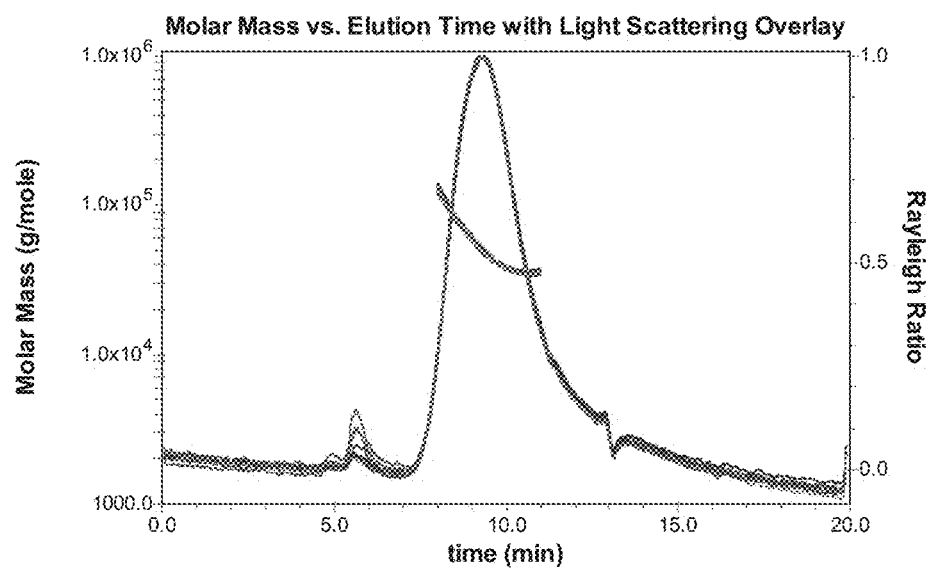
FIG. 1 shows the Size Exclusion Chromatography with Multi-Angle Laser Light Scattering (SEC-MALLS) results for the polymer of Preparation 3.

As used herein non-reactive means incapable of forming significant covalent bonding. The absence of significant covalent bonding means that while a minor degree of covalent bonding may be present, it is incidental to the retention of the wetting agent in the polymer. Whatever incidental covalent bonding may be present, it would not by itself be sufficient to maintain the association of the non-reactive hydrophilic polymers with or in the polymer matrix. Instead, the vastly predominating effect keeping the wetting agent associated with the polymer is entrapment of at least a portion of the silicone segment. The silicone segment is "entrapped", according to this specification, when it is physically retained within or anchored to the at least partially hydrophobic polymer matrix. This is done via entanglement of the silicone segment within the at least partially hydrophobic polymer matrix, van der Waals forces, dipole-dipole interactions, electrostatic attraction, hydrogen bonding and combinations of these effects.

As used herein at least partially hydrophobic polymer matrices are those which comprise repeating units derived from hydrophobic components such as hydrophobic monomers, macromers and prepolymers. Hydrophobic components are those which are not soluble in water, and which when polymerized have contact angles greater than about 90°.

As used herein, stable means that the compound does not undergo a change through a single autoclaving cycle of 121° C. for 30 minutes which would deleteriously affect the desired properties of either the wetting agent or the combination of the wetting agent and polymer substrate. For example, ester bonds between the siloxane segment and the hydrophilic polymer segment are in some embodiments undesirable. The autoclaving may be conducted dry or in the presence of an ophthalmically compatible saline solution, such as, but not limited to borate buffered saline.

As used herein near-monodisperse means a polydispersity of 1.5 or less. In some embodiments the polymers of the present invention display polydispersities of less than about 1.3, and in others between about 1.05 and 1.3.

As used herein associated means that the hydrophilic polymer is retained in the at least partially hydrophobic polymer without covalent bonding.

As used herein segment refers to a section of polymer having repeating units with similar properties, such as composition or hydrophilicity.

As used herein, silicone segment refers to —[SiO]—. The Si atom in each —[SiO]— repeating unit may be alkyl or aryl substituted, are preferably substituted with $C_{1-4}$ alkyl, and in one embodiment are substituted with methyl groups to form a dimethylsiloxane repeating unit.

As used herein linear silicone segment refers to siloxane repeating units having the silicon and oxygen atoms in polymer backbone. For example, polydimethylsiloxane is an example of a linear silicone segment because —SiO— groups are contained in the backbone. PolyTRIS is not a linear silicone segment, because the siloxane groups are contained pendant to the carbon-carbon backbone.

As used herein substrate refers to an article, such as a sheet, film, tube or more complex forms such as biomedical devices.

As used herein, a biomedical device is any article that is designed to be used while either in or on mammalian tissues or fluid. Examples of these devices include but are not limited to catheters, implants, stents, sutures and ophthalmic devices such as intraocular lenses and contact lenses and the like.

As used herein, the term lens refers to ophthalmic devices that reside in or on the eye. These devices can provide optical correction, cosmetic enhancement, UV blocking and visible light or glare reduction, therapeutic effect, including wound healing, delivery of drugs or nutraceuticals, diagnostic evaluation or monitoring, or any combination thereof. The term lens includes, but is not limited to, soft contact lenses, hard contact lenses, intraocular lenses, overlay lenses, ocular inserts, and optical inserts.

As used herein, a silicone-containing polymer is any polymer containing silicone or siloxane repeating units. The silicone-containing polymer may be a homopolymer, such as silicone elastomers, or a copolymer such as fluoro-silicones and silicone hydrogels. As used herein, silicone hydrogel refers to a polymer comprising silicone containing repeating units and a water content of at least about 10%, and in some embodiments at least about 20%.

As used herein RAFT refers to reversible addition fragmentation-chain transfer polymerization.

As used herein reactive components are the components in a polymerization reaction mixture which become part of the structure of the polymer upon polymerization. Thus, reactive components include monomers and macromers which are covalently bound into the polymer network, as well as components which do not become covalently bound to the polymer network, but are permanently or semi-permanently associated with the polymer. Examples of components which are not covalently bound include non-polymerizable wetting agents, pharmaceuticals and the like. Diluents and processing aids which do not become part of the structure of the polymer are not reactive components.

As used herein substituted refers to alkyl groups which contain halogens, esters, aryls, alkenes, alkynes, ketones, aldehydes, ethers, hydroxyls, amides, amines and combinations thereof.

As used herein free radical source refers to any suitable method of generating free radicals such as the thermally induced homolytic scission of a suitable compound(s) (thermal initiators such as peroxides, peroxyesters, or azo compounds), the spontaneous generation from monomer (e.g., styrene), redox initiating systems, photochemical initiating systems or high energy radiation such as electron beam, X- or gamma-radiation. Chemical species known to act as "free radical sources" are commonly called initiators by those skilled in the art and will be referred to as such for the purposes of this invention.

The stable, non-reactive hydrophilic polymers of the present invention comprise a hydrophilic segment and a linear silicone segment on at least one terminal end of said non-reactive hydrophilic polymer. The silicone segment comprises between about 5 and about 200 siloxy units.

In one embodiment, the stable, non-reactive hydrophilic polymers have the general Formula I:

Formula I

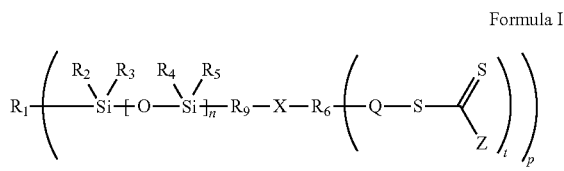

Wherein $R_1$ through $R_6$, $R_9$, X, Q, Z, n, t and p are defined below, and may be formed by contacting
(i) At least one hydrophilic monomer having the formula $H_2C=UV$,
(ii) a polysiloxane RAFT agent of Formula II having a chain transfer constant greater than 0.1, Formula II

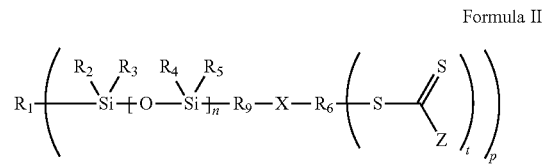

and
(iii) free radicals produced from a free radical source (i.e. an initiator).

In the above formulae, $R_1$ is selected from substituted and unsubstituted $C_{1-24}$ alkyl; in some embodiments substituted and unsubstituted $C_{1-10}$ alkyl and in other embodiments $C_{1-6}$, $C_{1-4}$, methyl or n-butyl;

$R_2$-$R_5$ are independently selected from H, $C_1$-$C_4$ alkyl and $C_{6-10}$ aryl, and combinations thereof, and in one embodiment, $R_2$-$R_5$ are independently selected from $C_1$-$C_4$ alkyl, and combinations thereof; and in another embodiment $R_2$-$R_5$ are methyl;

n is 6-200, 6-60, 6-50, 6-20, 6-15 and in some embodiments 6-12;

$R_9$ is selected from direct bond, $C_{1-12}$ alkylene, $C_{1-4}$ alkylene.

In polysiloxane RAFT agents of Formula II, $R_6$ is a free radical leaving group that initiates free radical polymerization. $R_6$ is selected from the divalent group consisting of optionally substituted alkyl; optionally substituted saturated, unsaturated or aromatic carbocyclic or heterocyclic rings; optionally substituted alkylthio; optionally substituted alkoxy; or optionally substituted dialkylamino. In one embodiment, $R_6$ is selected from optionally substituted benzyl, optionally substituted phenyl, ethanoate, optionally substituted propionate, 4-cyanopentanoate, or isobutyroate functionalities.

X is selected from —O—(CO)—, —(CO)O—, —$NR_8$—(CO)—, —(CO)$NR_8$—, —O—, or a direct bond;

$R_8$ is selected from H, methyl, ethyl or propyl;

Z is selected from the group consisting of hydrogen, chlorine, fluorine, optionally substituted alkyl, optionally substituted aryl, optionally substituted heterocyclyl, optionally substituted alkylthio, optionally substituted alkoxy, optionally substituted alkoxycarbonyl, optionally substituted aryloxycarbonyl (—COOR"), carboxy (—COOH), optionally substituted acyloxy (—$O_2$CR"), optionally substituted carbamoyl (—CONR"$_2$), cyano (—CN), dialkyl- or diaryl-phosphonato [—P(=O)(OR")$_2$], dialkyl- or diaryl-phosphinato [—P(=O)(OR")$_2$], and a polymer chain formed by any mechanism;

p is 1 or an integer greater than 1, 1-5, 3-5 and in some embodiments 1 or 2. When p≥2, then $R_1$ is selected from p-valent moieties derived from any of optionally substituted alkyl, optionally substituted aryl, a polymer chain, or a combination thereof, where the connecting moieties are selected from the group consisting of aliphatic carbon, aromatic carbon, silicon, and sulfur. Such an embodiment is disclosed in the following structural analogues of Formulas I and II, namely Formulas III and IV:

The hydrophilic segment, Q, comprises repeating units of the formula:

Formula VII

Wherein

U is selected from the group consisting of hydrogen, halogen, $C_1$-$C_4$ alkyl which may be optionally substituted with hydroxyl, alkoxy, aryloxy (OR"), carboxy, acyloxy, aroyloxy ($O_2$CR"), alkoxy-carbonyl, aryloxy-carbonyl ($CO_2$R") and combinations thereof;

V is independently selected from the group consisting of hydrogen, R", $CO_2$H, $CO_2$R", COR", CN, $CONH_2$, CONHR", CONR"$_2$, $O_2$CR", OR" and halogen; plus cyclic and acyclic N-vinyl amides;

R" is selected from the group consisting of optionally substituted $C_1$-$C_{18}$ alkyl, $C_2$-$C_{18}$ alkenyl, aryl, heterocyclyl, alkaryl wherein the substituents are indepen-

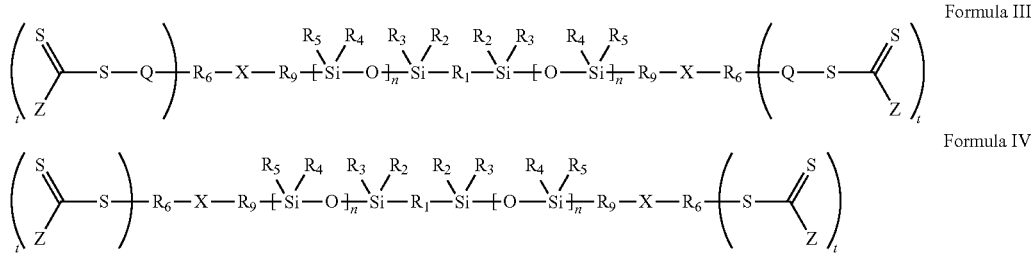

Formula III

Formula IV where t is 1 or an integer greater than 1. When t≥2, then $R_6$ is p-valent, and would be connected to more than one thiocarbonylthio functional group. Such an embodiment is disclosed in the following structural analogues of Formulas I and II, namely Formulas V and VI:

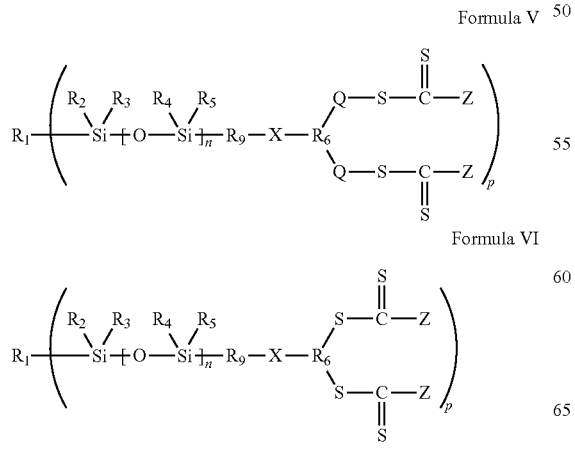

Formula V

Formula VI dently selected from the group that consists of epoxy, hydroxyl, alkoxy, acyl, acyloxy, carboxy and carboxylates, sulfonic acid and sulfonates, alkoxy- or aryloxy-carbonyl, isocyanato, cyano, silyl, halo, and dialkylamino; phosphoric acid. In one embodiment R" is selected from the group consisting of methyl, pyrrolidonyl, —N(CH$_3$)—COCH$_3$ [N-vinyl acetamide], —CH$_2$CH$_2$—COOH, —CH$_2$CH$_2$CH$_2$—COOH, —CH$_2$CH$_2$CH$_2$CH$_2$—COOH, —(CH$_3$)$_2$—CH$_2$—SO$_3$H, —CH$_2$CH$_2$CH$_2$—$^+$N(CH$_3$)$_2$—CH$_2$CH$_2$CH$_2$—SO$_3$$^-$.

In one embodiment, the substituents $R_{2-5}$ are the same. In another embodiment $R_{2-5}$ are the same and are selected from methyl, ethyl or phenyl. In yet another embodiment $R_{2-5}$ are the same and are selected from methyl or ethyl. In yet another embodiment each of $R_{2-5}$ is methyl.

Examples of stable, non-reactive hydrophilic polymers are shown below in Formula VIII with substituents $R_1$, X and $R_6$ identified by brackets:

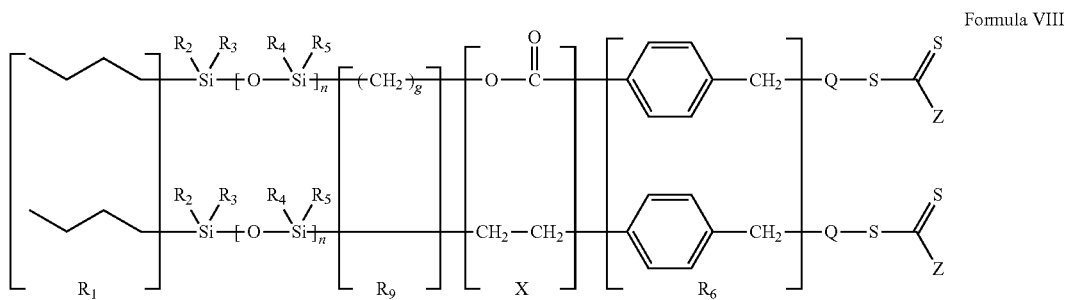

Formula VIII

Examples of stable, non-reactive hydrophilic polymers with p-valent $R_6$ linkages are included below:

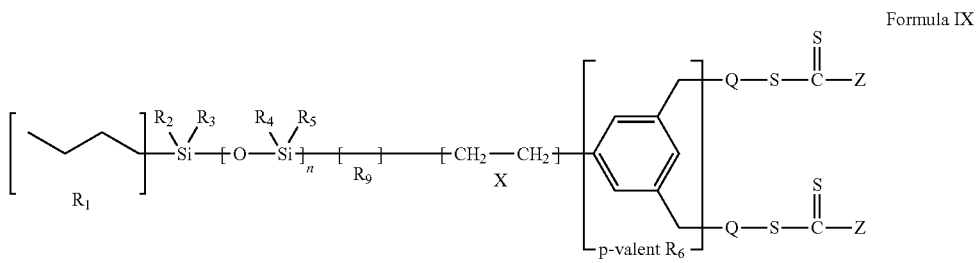

Formula IX

In another embodiment X is selected from ethylenyl or —O(C=O)—, with ethylenyl being preferred due to its hydrolytic stability.

In another embodiment $R_6$ is an alkylene selected from:

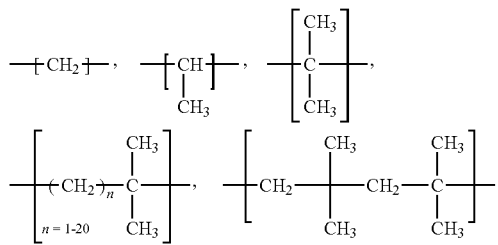

a nitriloalkyl selected from:

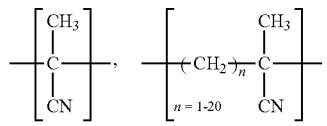

Or an aromatic group selected from:

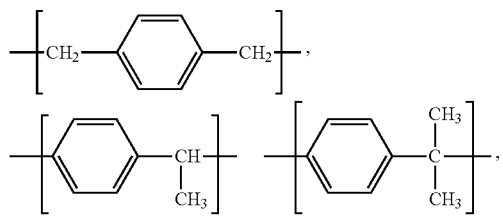

-continued

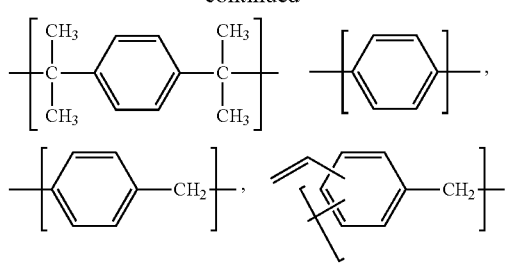

The selection of $R_6$ will be influenced by the thiocarbonyl compound selected and the monomer(s) used for polymerization in the next step.

In one embodiment, $R_6$ is selected from the following structures:

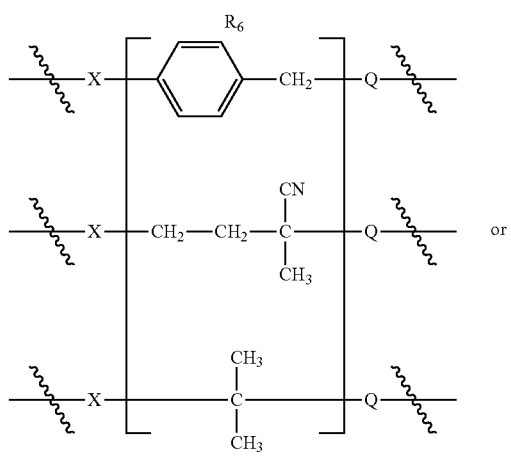

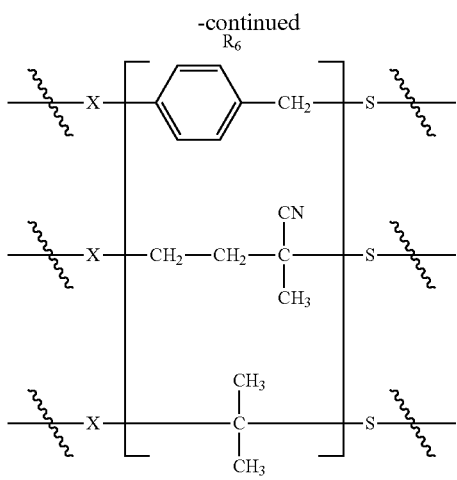

Formula X. Structures of $R_6$ polysiloxane-functional RAFT agent (right) final copolymer (left)

In one embodiment where $R_6$ is p-valent it may be comprised of the following structure:

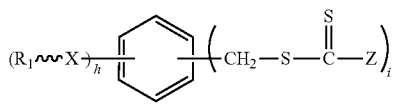

if h = 1, i = 1 to 5   if h = 4, m = 1 to 2
if h = 2, i = 1 to 4   if h = 5, m = 1
if h = 3, i = 1 to 3

Z is selected from optionally substituted alkoxy, optionally substituted alkylthio, optionally substituted aryl, or optionally substituted benzyl. In one embodiment Z is an optionally substituted alkylthio, and in another embodiment Z is an optionally substituted alkoxy.

It should be appreciated that the substitutions described above may be combined in any combination. For example, the foregoing description includes families of compounds having three separately defined substituent families for Z. Any of these substituent families may be combined with the substituent families disclosed for the other substituents.

The hydrophilic segment of the non-reactive hydrophilic polymer has a degree of polymerization between about 10 and about 1500, in some embodiments at least about 300 and in others at least about 500. In further embodiments the hydrophilic segment of the non-reactive hydrophilic polymer has a degree of polymerization within the following ranges about 300 to about 10,000, about 300 to about 5,000, between about 500 to about 10,000, about 500 to about 5,000 and about 500 to about 2000 and about 700 to about 2000. Degree of polymerization may be obtained from MALDI-TOF, SEC-MALLS, NMR or a combination thereof.

The hydrophilic segment may have any desired structure, such as linear, branched or comb structured. In one embodiment the hydrophilic segment is linear.

In one embodiment the hydrophilic segment may be formed from known hydrophilic monomers. Hydrophilic monomers are those which yield a clear single phase when mixed with water at 25° C. at a concentration of 10 wt %. Examples of hydrophilic monomers include vinyl amides, vinylimides, vinyl lactams, hydrophilic (meth)acrylates, (meth)acrylamides, styrenics, vinyl ethers, vinyl carbonates, vinyl carbamates, vinyl ureas and mixtures thereof.

Examples of suitable hydrophilic monomers include N-vinyl pyrrolidone, N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, vinylimidazole, N—N-dimethylacrylamide, acrylamide, N,N-bis(2-hydroxyethyl)acrylamide, acrylonitrile, N-isopropyl acrylamide, vinyl acetate, (meth)acrylic acid, polyethylene glycol (meth)acrylates, 2-ethyl oxazoline, N-(2-hydroxypropyl) (meth)acrylamide, N-(2-hydroxyethyl) (meth)acrylamide, 2-methacryloyloxyethyl phosphorylcholine, 3-(dimethyl(4-vinylbenzyl)ammonio)propane-1-sulfonate (DMVBAPS), 3-((3-acrylamidopropyl)dimethyl ammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethyl ammonio)propane-1-sulfonate (APDAPS), methacryloyloxy)propyl)dimethylammonio)propane-1-sulfonate (MAPDAPS), N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, and the like, and mixtures thereof. In one embodiment the hydrophilic monomer comprises N-vinyl pyrrolidone, N-vinyl-N-methylacetamide, 2-methacryloyloxyethyl phosphorylcholine, (meth)acrylic acid, N,N dimethylacrylamide and the like and mixtures thereof. In some embodiments the hydrophilic segment may also comprise charged monomers including but not limited to methacrylic acid, acrylic acid, 3-acrylamidopropionic acid, 4-acrylamidobutanoic acid, 5-acrylamidopentanoic acid, 3-acrylamido-3-methylbutanoic acid (AMBA), N-vinyloxycarbonyl-α-alanine, N-vinyloxycarbonyl-β-alanine (VINAL), 2-vinyl-4,4-dimethyl-2-oxazolin-5-one (VDMO), reactive sulfonate salts, including, sodium-2-(acrylamido)-2-methylpropane sulphonate (AMPS), 3-sulphopropyl (meth)acrylate potassium salt, 3-sulphopropyl (meth)acrylate sodium salt, bis 3-sulphopropyl itaconate di sodium, bis 3-sulphopropyl itaconate di potassium, vinyl sulphonate sodium salt, vinyl sulphonate salt, styrene sulfonate, sulfoethyl methacrylate, combinations thereof and the like. In embodiments where the hydrophilic segment comprises at least one charged hydrophilic monomer it may be desirable to include non-charged hydrophilic monomers as comonomers.

The degree of polymerization (DP) ratio of hydrophilic segments to linear silicone segments is between 20:1 and 500:1, in other embodiments, with ratios between 30:1 and 200:1, between 50:1 and 200:1, and in other embodiments ratios between 70:1 and 200:1.

The non-reactive, hydrophilic polymers of the present invention may be formed via a number of polymerization processes. In one embodiment the non-reactive, hydrophilic polymers are formed using RAFT polymerization. In another embodiment the non-reactive hydrophilic polymers are formed by conventional free radical polymerization.

Polysiloxane RAFT Agent

The polysiloxane RAFT agents of Formula II may be formed by reacting at least one reactive linear polysiloxane with at least one reactive group on an orthogonally reactive compound. In a subsequent or concurrent reaction, a reactive, thiocarbonylthio nucleophile is reacted on at least one other reactive group on the orthogonally reactive compound. Orthogonal reactive compounds comprise at least two reactive groups having different reactivities or reaction mechanisms such that reaction at one group can proceed to completion or near completion without reaction of at least one of the other reactive groups. Orthogonally reactive compounds have the structure

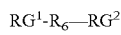

wherein $R_6$ is a free radical leaving group as defined above, and $RG^1$ and $RG^2$ are independently selected from paired orthogonally reactive groups such as, but not limited to, acid halides and alkyl halides, activated esters and alkyl halides, alkyl halides and unsaturated double-bonds, and mixtures thereof and the like. Examples of alkyl halides include $C_{1-20}$ bromides, $C_{1-20}$ chlorides and $C_{1-20}$ iodides, and more specifically methyl bromide, ethyl bromide, methyl chloride, ethyl chloride, methyl iodide, ethyl iodide, benzyl bromide, benzyl chloride, or benzyl iodide.

Examples of acid halides include acetyl chloride, acetyl bromide, acetyl iodide, benzyl chloride, benzyl bromide, benzyl iodide, propionyl chloride, propionyl bromide, and propionyl iodide. Examples of unsaturated double-bonds include vinylic and allylic-double bonds. Examples of activated esters include N-hydroxysuccinimidyl-, para-nitrophenolic-, and perfluorinated phenolic carbonyl esters. Specific examples of orthogonally reactive compounds include, but are not limited to, the following: para-chloromethylstyrene, 4-(bromomethyl)benzoyl bromide (4-BBB), 2-bromopropanoyl bromide, and 2-bromoacetyl bromide, and combinations thereof and the like. Other combinations will be apparent to those of skill in the art.

Suitable thiocarbonylthio moieties can include xanthate esters, dithioesters, dithiocarbamates, trithiocarbonates, and the like. Specific and preferred thiocarbonylthio functional groups are shown below in the following structures:

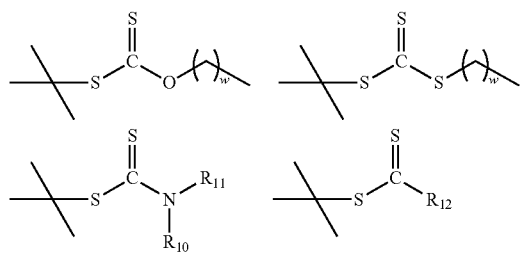

where w is an integer from 1-12, $R_{10}$, $R_{11}$, and $R_{12}$ can be any optionally substituted alkyl or aryl group. In one embodiments, $R_{10}$ is $C_1$-$C_6$ alkyl (with $C_1$ being most preferred) and $R_{11}$ is a phenyl group. In other embodiments, $R_{10}$ is a $C_{1-6}$ alkyl and $R_{11}$ is a carbon-linked aromatic heterocycle (e.g. 4-pyridinyl). In other embodiments, $R_{12}$ is a phenyl or benzyl, with phenyl being preferred.

In one embodiment, the polymerization agent is at least one thiocarbonylthio-containing compound, and in one embodiment, at least one xanthate. In another embodiment, the thiocarbonylthio-containing compound is a dithiocarbamate. In another embodiment, at least one trithiocarbonate is employed. Yet, in another embodiment, a dithioester is employed.

Examples of suitable reactive thiocarbonylthio nucleophiles include, but are not limited to O-alkyl-xanthogenate salts, N-alkyl-carbamodithioate salts, S-alkyl-trithiocarbonate salts, N-alkyl-carbamodithioate salts, and phenyl, benzyl, or alkyl dithioate salts. Preferred thiocarbonylthio nucleophiles include O-alkyl-xanthogenate salts and S-alkyl-trithiocarbonate salts. Specific examples include Group I and II Alkali Metal salts of O-ethyl carbonodithioate, O-propyl carbonodithioate, O-butyl carbonodithioate, O-pentyl carbonodithioate, O-hexyl carbonodithioate, O-decyl carbonodithioate, O-dodecyl carbonodithioate, O-(2,3-dihydroxypropyl) carbonodithioate, ethyl carbonotrithioate, propyl carbonotrithioate, butyl carbonotrithioate, pentyl carbonotrithioate, hexyl carbonotrithioate, decyl carbonotrithioate, dodecyl carbonotrithioate, 2,3-dihydroxypropyl carbonotrithioate, methyl(phenyl)carbamodithioate, methyl (pyridin-4-yl)carbamodithioate, benzodithioate, and 2-phenylethanedithioate.

The reaction of the orthogonally reactive compound and the thiocarbonylthio nucleophile form a chain transfer agent which is bound to the polysiloxane. The order of these reactions is not always critical and the components may be reacted in the order described above, together in one pot, or the thiocarbonylthio nucleophile and the orthogonal reactive component may be pre-reacted to form a chain transfer agent which may then be reacted with the reactive, linear polysiloxane.

When $R_1$ is monovalent, the reactive linear polysiloxane is terminated on one end by $R_1$ (as defined above) and on the other by a group capable of reacting with at least one of the orthogonally reactive groups $RG^1$ and $RG^2$. For example when at least one of $RG^1$ or $RG^2$ is a vinyl, the polysiloxane reactive group may be a silane. In another example where at least one $RG^1$ or $RG^2$ is an activated ester, the polysiloxane reactive group may be a nucleophilic moiety such as a primary alcohol or amine, which may be selected from aminopropyl or hydroxypropyl. The polysiloxane may be selected from $C_1$-$C_4$ polyalkyl and polyaryl siloxanes. Examples of suitable polysiloxanes include polydimethylsiloxane, polydiethylsiloxane, polydiphenylsiloxanes and copolymers thereof. The reactive linear polysiloxane may be selected from compounds of the formula:

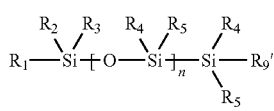

Formula XI

Wherein $R_1$ through $R_5$ are defined as above, and n is about 6-about 200, about 6-about 60, about 6-about 50, about 6-about 20, about 6-about 15, about 6-about 12 and in some embodiments about 10-about 12 siloxane repeating units. For example, it will be appreciated n in some embodiments may represent a range. For example reactive linear polysiloxane where n is 10 may contain polysiloxanes having repeating units ranging from 8 to 12, centered around 10.

$R_{9'}$ is independently selected from H, unsubstituted $C_{1-12}$ alkyl, $C_{1-12}$ alkyl substituted with hydroxyl, amino and the like, and in some embodiments, $R_{9'}$ is selected from unsubstituted $C_{1-4}$ alkyl, $C_{1-4}$ alkyl substituted with hydroxyl, amino and the like and combinations thereof.

Specific examples of reactive linear polysiloxanes include

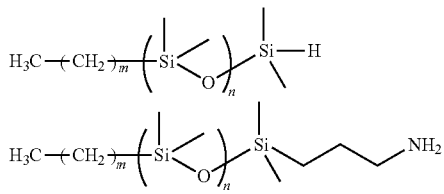

-continued

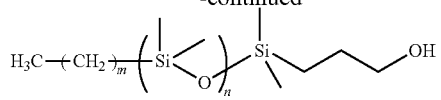

(5)

In one embodiment m is 0 to 9, 0 to 5, and in some embodiments 0-3, and in some embodiments 0 or 3.

When the polysiloxane-functional RAFT agent is prepared via esterification or amidation with an orthogonally reactive compound containing both an acid halide and an alkyl halide (e.g. 4-BBB), the reaction may be conducted in the presence of at least one acid scavenger. This is depicted in Reaction Scheme I, below. Acid scavengers include carbonate salts, such as $Na_2CO_3$ or $Li_2CO_3$, tertiary amines, such as triethylamine (TEA), or a non-nucleophilic hindered secondary amine, such as 2,2,6,6-tetramethylpiperidine (TMP). To prevent uncontrolled scrambling of the polysiloxane during the reaction, TMP is preferred over carbonate salts. Also, in some embodiments, TMP is preferred over TEA due to its low reactivity with alkyl halides and acid halides. Sterically-hindered tertiary amines, such as ethyl-di(2-methylpropyl)amine, may also be used, so long as their reactivity with alkyl and acid halides is very low.

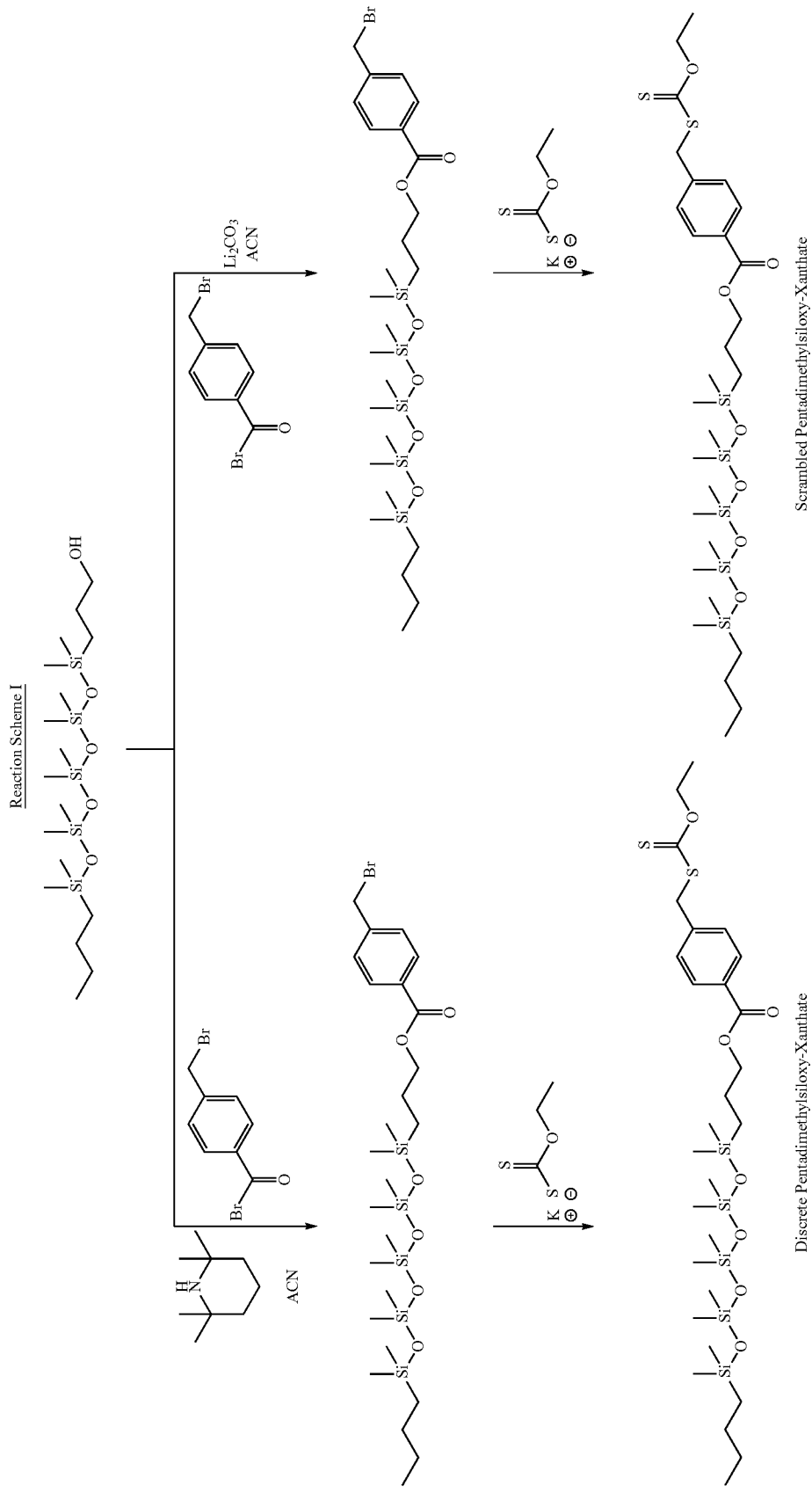

When the polysiloxane-functional RAFT agent is prepared via hydrosilylation chemistry with an orthogonally reactive compound containing a reactive double bond and an alkyl halide (e.g. 1-(chloromethyl)-4-vinylbenzene), the reaction is conducted in the presence of a Pt catalyst, such as Karlsteadt's Catalyst. This reaction pathway, shown below in Reaction Scheme II, is preferred to esterification or amidiation, due to the fact that the number of required reaction steps is lower and the scrambling of the polysiloxane is mitigated. Furthermore, the final product of this reaction pathway yields a more hydrolytically stable linkage (i.e. X) between $R_6$ and the polydialkylsiloxane chain. In the final RAFT polymer, this yields a pure carbon-containing divalent linkage between the polydialkylsiloxane segment and the hydrophilic polymer.

Reaction Scheme II

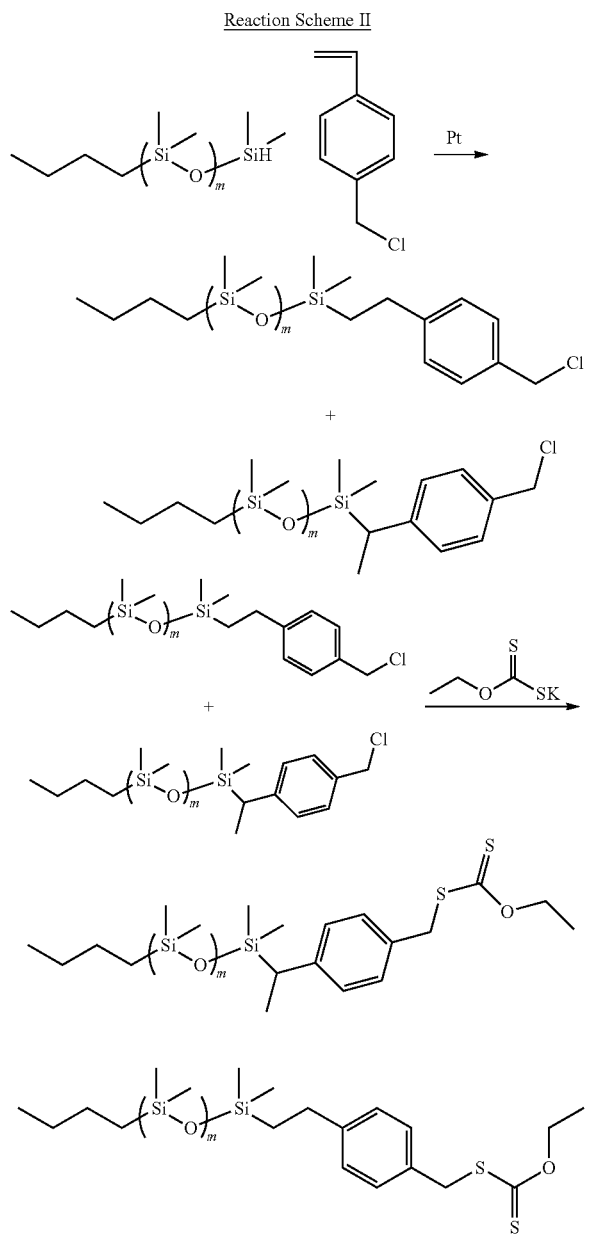

The number of polydialkylsiloxane groups and thiocarbonylthio-moieties that are reacted with the orthogonally-reactive compound depends upon the nature of the reactive silicone, the nature and number of the specific functional groups on the orthogonally-reactive component, and the reactive nature of the thiocarbonylthio nucleophile used to form the final compound of interest, namely the polydialkyl-siloxane-functional RAFT agent. For example, if a hydroxy-propyl-terminal n-butylpolydimethylsiloxane is reacted with 4-(bromomethyl)benzoyl bromide (4-BBB) in the presence of TMP (see Reaction Scheme I), one skilled in the art would expect to observe ester formation between the hydroxypropyl-terminal n-butyl polydimethylsiloxane and the acid bromide of 4-BBB. One would not expect a thiocarbonylthio nucleophilic salt, such as potassium O-ethyl carbonodithioate (EX), to react with the acid chloride on 4-BBB; but instead, displacement of the acid bromide on the 4-BBB with EX would be anticipated. If an orthogonally-reactive compound containing one acid halide and two alkyl halides was employed instead of 4-BBB, e.g. 3,5-bis(bromomethyl) benzoyl bromide, one would expect to obtain a polydialkyl-siloxane-functional RAFT agent containing two separate, but covalently attached, thiocarbonylthio moieties. When polymerized in the presence of a hydrophilic monomer, this specific polysiloxane-functional RAFT agent would yield a polymeric structure containing a single polysiloxane segment at one end of the chain and two hydrophilic segments at the opposite end. Analogous synthetic pathways that employ above-mentioned hydrosilylation chemistry and lead to structures with two or more hydrophilic segments and one linear silicone segment, or structures with two or more linear silicone segments and one hydrophilic segment would be understood by those skilled in the art to be suitable for the present invention.

The reaction may be conducted at temperatures ranging from 0° C. to about 100° C. In one embodiment the reaction is conducted at about ambient temperature. The reaction may be conducted for times from about 1 min to about 24 hours, and in some embodiments from about 1 hour to about 3 hours. The product of the reaction is a polysiloxane RAFT agent.

The reaction may be conducted neat or in at least one polar aprotic solvent which is capable of dissolving the polysiloxane monomer, thiocarbonyl compound and the orthogonally reactive compound and the intermediates formed by their reaction. Suitable solvents include acetonitrile, acetone, DMF, NMP and combinations thereof and the like.

In one embodiment the polydimethylsiloxane RAFT agent is contacted with an appropriately selected monomer, a free radical initiating species (i.e. a free radical initiator such as CGI-819 or AIBN), and optionally, a solvent that is capable of solvating all reactants and products used in and resulting from the reaction, respectively. Reaction times for this step are from about 1 minute to about 12 hours and in some embodiments from about 1 to about 6 hours. Reaction temperatures include those between about 0° C. and about 150° C.

Polymerization Conditions

The molecular weight of the final polymer produced from contacting a polysiloxane-functional RAFT agent with at least one hydrophilic monomer and free radical initiator is controlled by the following equation:

$$M_n = \frac{[M]}{[CTA]} \cdot X \cdot MW_{monomer} + MW_{CTA} \qquad \text{Equation 1}$$

where $M_n$ is the number-average molecular weight, [M] and [CTA] are the hydrophilic monomer and polysiloxane RAFT agent concentrations, respectively, X is the hydrophilic monomer conversion, $MW_{monomer}$ is the molecular weight of the hydrophilic monomer, and $MW_{CTA}$ is the molecular weight of the polysiloxane RAFT agent. Rearrangement of the equation by solving for $M_n/MW_{monomer}$ gives the predicted degree of polymerization (DP) for the hydrophilic polymer segment at a given monomer conversion. If X is unity (i.e. the polymerization is at 100% conversion), and $MW_{CTA}$ is neglected in the calculation because it contains the silicone segment, the equation reduces to an expression that predicts the target hydrophilic DP that would be obtained for a given [M]:[CTA] ratio at 100% conversion:

$$\frac{M_n}{MW_{monomer}} = DP_{Hydrophilic} = \frac{[M]}{[CTA]} \qquad \text{Equation 2}$$

For the purposes of this invention, preferred target [M]:[CTA] ratios are from about 10 to 2500, with 50 to 1500 being more preferred, and 200-1000 being most preferred.

The polydispersity of the non-reactive hydrophilic polymer may be controlled by varying the molar ratio of polysiloxane RAFT agent to free radicals produced. Typically, increasing the molar ratio of polysiloxane RAFT agent to initiator (e.g. from 3 to 10), would decrease the amount of initiator-derived chains, thereby yielding polymers of lower polydispersity.

Polymerization conditions for the polymerization of the hydrophilic monomer in the presence of the appropriate polydialkylsiloxane RAFT agent to form the non-reactive hydrophilic polymer are selected based upon the initiator system used and to provide the desired balance between chain growth and termination. Other polymerization components, such as solvents, initiator and additives may also be selected such that they have a low transfer constant toward the propagating radical.

In embodiments where the non-reactive hydrophilic polymer is made via RAFT, the initiating system is chosen such that under the reaction conditions there is no substantial adverse interaction of the initiator or the initiating radicals with the transfer agent. The initiator should also have the requisite solubility in the reaction medium or monomer mixture. The initiator is selected based upon the hydrophilic monomer selected. So for example, where free radical reactive hydrophilic monomers are used, the initiator may be any initiator capable of providing a radical source, such as photoinitiators, thermal initiators, redox initiators and gamma initiators. Suitable photoinitiators include the UV and visible photoinitiators described below. Thermal initiators are chosen to have an appropriate half life at the temperature of polymerization. These initiators can include one or more of the following compounds: 2,2'-azobis(isobutyronitrile), 2,2'-azobis(2-cyano-2-butane), dimethyl 2,2'-azobisdimethylisobutyrate 4,4'-azobis(4-cyanopentanoic acid), 1,1'-azobis(cyclohexanecarbonitrile, 2-(t-butylazo)-2-cyanopropane, 2,2'-azobis[2-methyl-N-(1,1)-bis(hydroxymethyl)-2-hydroxyethyl] propionamide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane)dihydrochloride, 2,2'-azobis(N,N'-dimethyleneisobutyramine), 2,2'-azobis(2-methyl-N-[1,1-bis(hydroxymethyl)-2-hydroxyethyl] propionamide, 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide)dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyraate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. In one embodiment, the thermal initiator is selected from initiators that generate free radicals at moderately elevated temperatures, such as lauryl peroxide, benzoyl peroxide, isopropyl percarbonate, azobisisobutyronitrile combinations thereof, and the like. Examples of redox initiators include combinations of the following oxidants and reductants:

oxidants: potassium peroxydisulfate, hydrogen peroxide, t-butyl hydroperoxide.

reductants: iron (II), titanium (III), potassium thiosulfite, potassium bisulfate.

In one embodiment the initiator is selected from photoinitiators which have the requisite solubility in the reaction medium or monomer mixture and have an appropriate quantum yield for radical production under the conditions of the polymerization. Examples include benzoin derivatives, benzophenone, acyl phosphine oxides, and photo-redox systems. In another embodiment the initiator is selected from visible initiators selected from 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate, combinations thereof and the like. In another embodiment the initiator comprises at least one phosphine oxide containing photoinitiator, and in another embodiment, bis (2,4,6-trimethylbenzoyl)-phenyl phosphineoxide. When a photoinitiator is used, the reaction mixture is irradiated using radiation in the activating wavelength for the selected photoinitiator.

The polymerization may be conducted in solution, suspension or emulsion, under batch, continuous or feed mode. In one embodiment the process is conducted by adding polymerization agent to the reaction mixture containing the polysiloxane terminated chain transfer agent. Other conditions may be used and are known in the art.

Non-Reactive Hydrophilic Polymer

The hydrophilic polymer may be purified via known means such as solvent precipitation and/or subsequent solvent extractions.

The hydrophilic polymers of the present invention have
(a) at least one terminal, non-reactive polysiloxane having about 6-about 200, about 6-about 60, about 6-about 50, about 6-about 20, about 6-about 15, about 6-about 12 and in some embodiments about 10-about 12 siloxane repeating units;
(b) and bound to said non-reactive polysiloxane via a linking group, L, at least one hydrophilic polymeric chain having a degree of polymerization of at least about 300, at least about 500, about 300 to about 10,000, about 300 to about 5,000, between about 500 to about 10,000, about 500 to about 5,000 and about 500 to about 2000, and, in some embodiments where RAFT polymerization is used and where the RAFT agent is not removed prior to use, a RAFT polymerization agent at the terminal end.

Frequently the RAFT polymerization agents are not thermally or hydrolytically stable, and thus it is a benefit of the present invention that the RAFT polymerization agents are at the terminal end as they may be readily cleaved or replaced prior to incorporation into the polymer substrates. Prior to their end-use, the, non-reactive hydrophilic polymers may be isolated and employed in a second "chain-extension" polymerization with a second suitable monomer. Alternatively, the RAFT polymerization agent may be left on the hydrophilic polymer and either cleaved during incorporation into the polymer substrate or during use (if the RAFT and/or its degradants are non-toxic, non-irritating). In one embodiment the RAFT polymerization agent is removed prior to incorporating the non-reactive hydrophilic polymers into the substrates, or the solutions to be contacted with the substrates. Suitable processes for removing the end groups include, but are not limited to reaction with amines, such as disclosed in U.S. Pat. No. 7,109,276, U.S. Pat. No. 6,794,486, U.S. Pat. No. 7,807,755, US2007232783, US2010137548, U.S. Pat. No. 5,385,996, U.S. Pat. No. 5,874,511.

In one embodiment, the non-reactive hydrophilic polymers of the present invention have the structure represented in Formula I, above.

In another embodiment, the non-reactive hydrophilic polymers may be formed using conventional free radical reactions. In this embodiment the non-reactive hydrophilic polymers may be formed by the free radical reaction of at least one hydrophilic monomer and an azo-type macro initiator with a hydrophobic segment having a molecular weight between about 300 and about 1800 via processes disclosed in US2010/0099829 and co-filed application U.S. Ser. No. 61/482,260.

The hydrophilic polymers of the present invention may be non-covalently associated with a variety of polymers including polysiloxanes, silicone hydrogels, polymethyl methacrylate, polyethylene, polypropylene, polycarbonate, polyethylene teraphthalate, polytetrafluoroethylene, and mixtures and copolymers thereof and the like.

Additional examples of at least partially hydrophobic polymer matrices include highly crosslinked ultra high molecular weight polyethylene (UHMWPE), which is used for implantable devices, such as joint replacements, are made typically has a molecular weight of at least about 400,000, and in some embodiments from about 1,000,000 to about 10,000,000 as defined by a melt index (ASTM D-1238) of essentially 0 and reduced specific gravity of greater than 8 and in some embodiments between about 25 and 30.

Absorbable polymers suitable for use as yarns in making sutures and wound dressings include but are not limited to aliphatic polyesters which include but are not limited to homopolymers and copolymers of lactide (which includes lactic acid d-,l- and meso lactide), glycolide (including glycolic acid), ε-caprolactone, p-dioxanone (1,4-dioxan-2-one), trimethylene carbonate (1,3-dioxan-2-one), alkyl derivatives of trimethylene carbonate, δ-vaterolactone, β-butyrolactone, γ-butyrolactone, ε-decalactone, hydroxybutyrate, hydroxyvalerate, 1,4-dioxepan-2-one (including its dimer 1,5,8,12-tetraoxacyclotetradecane-7,14-dione), 1,5-dioxepan-2-one, 6,6-dimethyl-1,4-dioxan-2-one and polymer blends thereof.

Non-absorbable polymer materials such as but are not limited to, polyamides (polyhexamethylene adipamide (nylon 66), polyhexamethylene sebacamide (nylon 610), polycapramide (nylon 6), polydodecanamide (nylon 12) and polyhexamethylene isophthalamide (nylon 61) copolymers and blends thereof), polyesters (e.g. polyethylene terephthalate, polybutyl terephthalate, copolymers and blends thereof), fluoropolymers (e.g. polytetrafluoroethylene and polyvinylidene fluoride) polyolefins (e.g. polypropylene including isotactic and syndiotactic polypropylene and blends thereof, as well as, blends composed predominately of isotactic or syndiotactic polypropylene blended with heterotactic polypropylene (such as are described in U.S. Pat. No. 4,557,264 issued Dec. 10, 1985 assigned to Ethicon, Inc. hereby incorporated by reference) and polyethylene (such as is described in U.S. Pat. No. 4,557,264 issued Dec. 10, 1985 assigned to Ethicon, Inc. and combinations thereof.

The body of the punctal plugs may be made of any suitable biocompatible polymer including, without limitation, silicone, silicone blends, silicone co-polymers, such as, for example, hydrophilic monomers of pHEMA (polyhydroxyethlymethacrylate), polyethylene glycol, polyvinylpyrrolidone, and glycerol, and silicone hydrogel polymers such as, for example, those described in U.S. Pat. Nos. 5,962,548, 6,020,445, 6,099,852, 6,367,929, and 6,822,016. Other suitable biocompatible materials include, for example fluorinated polymers, such as, for example, polytetrafluoroethylene ("PTFE"), polyvinylidene fluoride ("PVDF"), and teflon; polypropylene; polyethylene; nylon; and ethylene vinyl alcohol ("EVA").

Polymeric parts of ultrasonic surgical instruments may be made from polyimides, fluora ethylene propene (FEP Teflon), PTFE Teflon, silicone rubber, EPDM rubber, any of which may be filled with materials such as Teflon or graphite or unfilled. Examples are disclosed in US20050192610 and U.S. Pat. No. 6,458,142. For these embodiments, the non-reactive hydrophilic polymer may be mixed with a solvent that swells the at least partially hydrophobic polymer matrix and then contacted with the polymer matrix.

In one embodiment the hydrophilic polymers are associated with preformed articles including silicone ophthalmic devices such as lenses or punctual plugs, silicone hydrogel articles, such as silicone hydrogel lenses. In this embodiment it is believed that the terminal polysiloxane associates with the substrate which comprises hydrophobic polymer components. In this embodiment the hydrophilic polymer is dissolved in a solvent which also swells the substrate. The polymer substrate is contacted with a solution comprising the hydrophilic polymer. When the substrate is a silicone hydrogel article, such as a contact lens, suitable solvents include packing solution, storing solution and cleaning solutions. Using this embodiment as an example, the silicone hydrogel lens is placed in a packing solution comprising the hydrophilic polymer. The hydrophilic polymer is present in the solution in amounts between about 0.001 and about 10%, in some embodiments between about 0.005 and about 2% and in other embodiments between about 0.01 and about 0.5 weight %, based upon all components in the solution.

The packing solutions of the invention may be any water-based solution that is used for the storage of contact lenses. Typical solutions include, without limitation, saline solutions, other buffered solutions, and deionized water. The preferred aqueous solution is saline solution containing salts including, without limitation, sodium chloride, sodium borate, sodium phosphate, sodium hydrogenphosphate, sodium dihydrogenphosphate, or the corresponding potassium salts of the same. These ingredients are generally combined to form buffered solutions that include an acid and its conjugate base, so that addition of acids and bases cause only a relatively small change in pH. The buffered solutions may additionally include 2-(N-morpholino)ethanesulfonic acid (MES), sodium hydroxide, 2,2-bis(hydroxymethyl)-2, 2',2"-nitrilotriethanol, n-tris(hydroxymethyl)methyl-2-aminoethanesulfonic acid, citric acid, sodium citrate, sodium carbonate, sodium bicarbonate, acetic acid, sodium acetate, ethylenediamine tetraacetic acid and the like and combinations thereof. Preferably, the solution is a borate buffered or phosphate buffered saline solution. The solutions may also include known additional components such as viscosity adjusting agents, antimicrobial agents, polyelectrolytes, stabilizers, chelants, antioxidants, combinations thereof and the like.

The substrate is contacted with the hydrophilic polymer under conditions sufficient to incorporate a lubricious and surface-wetting effective amount of the hydrophilic polymer. As used herein, a lubricious effective amount, is an amount necessary to impart a level of lubricity which may be felt manually (such as by rubbing the device between one's fingers) or when the device is used. Additionally, as used herein, a surface-wetting effective amount is an amount necessary to impart a level of increased wettability to the lens, as determined via known contact angle measurement techniques (i.e. sessile drop, captive bubble, or dynamic contact angle measurements). It has been found that in one embodiment, where the device is a soft contact lens, amounts of hydrophilic polymer as little as 50 ppm provide improved lens "feel" and lowered surface contact angles, as measured by sessile drop. Amounts of hydrophilic polymer greater than about 50 ppm, and more preferably amounts greater than about 100 ppm in the processing packaging, storing or cleaning solution, add a more pronounced improvement in feel. Thus, in this embodiment, the hydrophilic polymer may included in a solution in concentrations up to about 5000 ppm, in some embodiments between about 10 and 5000 ppm, and in some embodiments between about 10 and about 2000 ppm. The packaged lens may be heat treated to increase the amount of hydrophilic polymer which permeates and becomes entangled in the lens. Suitable heat treatments, include, but are not limited to conventional heat sterilization cycles, which include temperatures of about 120° C. for times of about 20 minutes and may be conducted in an autoclave. If heat sterilization is not used, the packaged lens may be separately heat treated. Suitable temperatures for separate heat treatment include at least about 40° C., and preferably between about 50° C. and the boiling point of the solution. Suitable heat treatment times include at least about 10 minutes. It will be appreciated that higher temperatures will require less treatment time.

Many silicone hydrogel materials are known and may be used, including but not limited to senofilcon, galyfilcon, lotrafilcon A and lotrafilcon B, balafilcon, comfilcon and the like. Almost any silicone hydrogel polymer can be treated using the hydrophilic polymers of the present invention, including but not limited to those disclosed in U.S. Pat. No. 6,637,929, WO03/022321, WO03/022322, U.S. Pat. No. 5,260,000, U.S. Pat. No. 5,034,461, U.S. Pat. No. 6,867,245, WO2008/061992, U.S. Pat. No. 5,760,100, U.S. Pat. No. 7,553,880.

Similar processes may be used for substrates made from polymers other than silicone hydrogels. The primary change will be in the selection of the solvent, which should solubilize the hydrophilic polymer and swell the substrate. Mixtures of solvents maybe used, and additional components, such as surfactants may be included if desired. For example where the article is a silicone article such as a silicone contact lens or a silicone punctal plug, the hydrophilic polymer may be dissolved in a solvent such as aliphatic alcohols, water and mixtures thereof. Specific examples include isopropanol, n-propanol and the like, at the concentrations described above.

In another embodiment, the hydrophilic polymer may be included in the reaction mixture from which the polymeric article is made. In such an embodiment, effective amounts of hydrophilic polymer might include quantities from about 0.1% to 50% of the total weight of all lens components, with quantities from about 1% to 20% being more preferred, and quantities from about 2% to 15% being most preferred. For example, where the article is a silicone hydrogel contact lens, the hydrophilic polymer may be included, in amounts up to about 20 weight % in the contact lens reaction mixture with one or more silicone-containing components and one or more hydrophilic components. The silicone-containing components and hydrophilic components used to make the polymer of this invention can be any of the known components used in the prior art to make silicone hydrogels. These terms, specifically silicone-containing component and hydrophilic component, are not mutually exclusive, in that, the silicone-containing component can be somewhat hydrophilic and the hydrophilic component can comprise some silicone, because the silicone-containing component can have hydrophilic groups and the hydrophilic components can have silicone groups.

One advantage of the hydrophilic polymers of the present invention is in embodiments where the non-reactive hydrophilic polymer is formed by RAFT, the molecular weight (MW) and molecular weight distribution (MWD) may be readily controlled depending on the requirements of manufacture for the chosen article. For example, in one embodiment where the hydrophilic polymer is incorporated into a low viscosity reactive monomer mix, such as those used to form cast molded contact lenses, the MW and MWD of the hydrophilic polymer may be kept below about 100,000 g/mol with a polydispersity of less than about 1.3. Having lower MW hydrophilic polymer allows addition of a higher concentration of the hydrophilic polymers of the present invention compared to commercially available polymers, such as PVP. Conventional polymers, such as PVP, have higher polydispersities, which can result in extremely viscous monomer mixes that tend to have processing issues due to stringiness.

A silicone-containing component is one that contains at least one [—Si—O—] group, in a monomer, macromer or prepolymer. In one embodiment, the Si and attached 0 are present in the silicone-containing component in an amount greater than 20 weight percent, and in another embodiment greater than 30 weight percent of the total molecular weight of the silicone-containing component. Useful silicone-containing components comprise polymerizable functional groups such as (meth)acrylate, (meth)acrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. All of the patents cited herein are hereby incorporated in their entireties by reference. These references disclose many examples of olefinic silicone-containing components.

Suitable silicone-containing components include compounds of Formula I

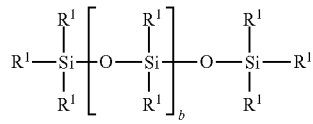

where R$^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In another embodiment, one to four $R^1$ comprises a vinyl carbonate or carbamate of the formula:

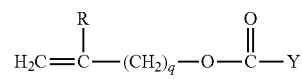

Formula XII wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris(trimethylsiloxy)silyl] propyl allyl carbamate; 3-[tris(trimethylsiloxy)silyl] propyl vinyl carbamate; trimethylsilylethyl vinyl carbonate; trimethylsilylmethyl vinyl carbonate, and

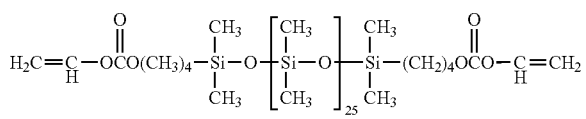

Where biomedical devices with modulus below about 200 are desired, only one $R^1$ shall comprise a monovalent reactive group and no more than two of the remaining $R^1$ groups will comprise monovalent siloxane groups.

In one embodiment, where a silicone hydrogel lens is desired, the lens of the present invention will be made from a reactive mixture comprising at least about 20 weight % and in some embodiments between about 20 and 70% wt silicone-containing components based on total weight of reactive monomer components from which the polymer is made.

Another class of silicone-containing components includes polyurethane macromers of the following formulae:

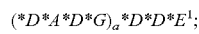

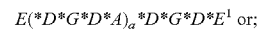

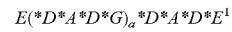   Formulae XIII-XV wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1;

A denotes a divalent polymeric radical of formula:

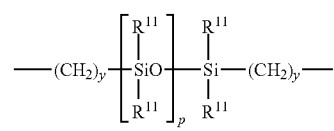

Formula XVI $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

Formula XVII

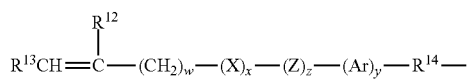

wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

In one embodiment the silicone-containing component comprises a polyurethane macromer represented by the following formula:

016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

Hydrophilic components include those which are capable of providing at least about 20% and in some embodiments at least about 25% water content to the resulting lens when combined with the remaining reactive components. Suitable hydrophilic components include hydrophilic monomers, prepolymers and polymers and may be present in amounts between about 10 to about 60 weight % based upon the weight of all reactive components, in some embodiments about 15 to about 50 weight %, and in other embodiments between about 20 to about 40 weight %. The hydrophilic monomers that may be used to make the polymers of this invention have at least one polymerizable double bond and Formula XVIII

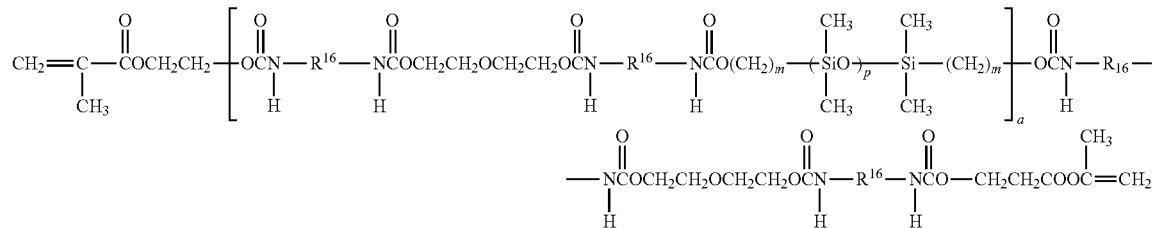

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic- Formula XIX

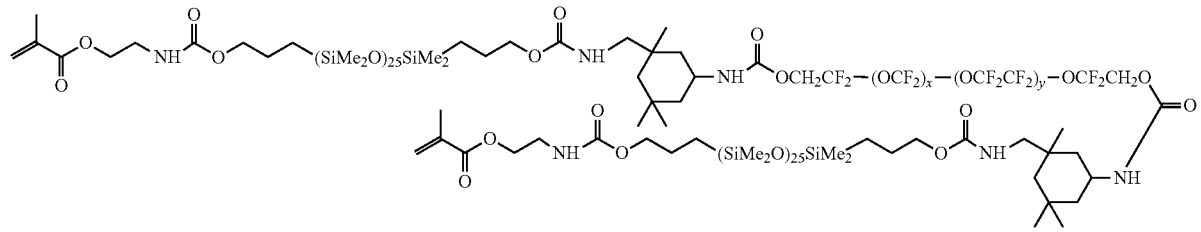

Other silicone-containing components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone containing macromers made via GTP, such as those disclosed in U.S. Pat. Nos. 5,314,960, 5,331,067, 5,244,981, 5,371,147 and 6,367,929. U.S. Pat. Nos. 5,321,108; 5,387,662 and 5,539, containing" monomers are those monomers containing the acrylic group (CR'H═CRCOX)

wherein R is H or $CH_3$, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, with NVP being preferred in one embodiment.

Other hydrophilic monomers that can be employed in the invention include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

In one embodiment the hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), N-vinyl methacrylamide, HEMA, and polyethyleneglycol monomethacrylate.

In another embodiment the hydrophilic monomers include DMA, NVP, HEMA and mixtures thereof.

The reactive mixtures of the present invention may also comprise as hydrophilic components one or more hydrophilic polymer(s). As used herein, hydrophilic polymer refers to substances having a weight average molecular weight of no less than about 5,000 Daltons, wherein said substances upon incorporation to silicone hydrogel formulations, increase the wettability of the cured silicone hydrogels. In one embodiment the weight average molecular weight of these hydrophilic polymers is greater than about 30,000; in another between about 150,000 to about 2,000,000 Daltons, in yet another between about 300,000 to about 1,800,000 Daltons, and in yet another about 500,000 to about 1,500,000 Daltons.

Alternatively, the molecular weight of hydrophilic polymers of the invention can be also expressed by the K-value, based on kinematic viscosity measurements, as described in Encyclopedia of Polymer Science and Engineering, N-Vinyl Amide Polymers, Second edition, Vol 17, pgs. 198-257, John Wiley & Sons Inc. When expressed in this manner, hydrophilic monomers having K-values of greater than about 46 and in one embodiment between about 46 and about 150. The hydrophilic polymers are present in the formulations of these devices in an amount sufficient to provide contact lenses and provide at least a 10% improvement in wettability and in some embodiments provide wettable lenses without surface treatments. For a contact lens, "wettable" is a lens which displays an advancing dynamic contact angle of less than about 80°, less than 70° and in some embodiments less than about 60°.

Suitable amounts of hydrophilic polymer include from about 1 to about 20 weight percent, in some embodiments about 5 to about 17 percent, in other embodiments about 6 to about 15 percent, all based upon the total of all reactive components.

Examples of hydrophilic polymers include but are not limited to polyamides, polylactones, polyimides, polylactams and functionalized polyamides, polylactones, polyimides, polylactams, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Hydrophilic prepolymers made from DMA or n-vinyl pyrrolidone with glycidyl methacrylate may also be used. The glycidyl methacrylate ring can be opened to give a diol which may be used in conjunction with other hydrophilic prepolymer in a mixed system to increase the compatibility of the hydrophilic polymer, hydroxyl-functionalized silicone containing monomer and any other groups which impart compatibility. In one embodiment the hydrophilic polymers contain at least one cyclic moiety in their backbone, such as but not limited to, a cyclic amide or cyclic imide. Hydrophilic polymers include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyacrylic acid, polyethyleneoxide, poly-2-ethyl-oxazoline, heparin polysaccharides, polysaccharides, mixtures and copolymers (including block or random, branched, multichain, comb-shaped or star shaped) thereof, where poly-N-vinylpyrrolidone (PVP) is particularly preferred in one embodiment. Copolymers might also be used such as graft copolymers of PVP.

The hydrophilic polymers provide improved wettability, and particularly improved in vivo wettability to the medical devices of the present invention. Without being bound by any theory, it is believed that the hydrophilic polymers are hydrogen bond receivers which in aqueous environments, hydrogen bond to water, thus becoming effectively more hydrophilic. The absence of water facilitates the incorporation of the hydrophilic polymer in the reaction mixture. Aside from the specifically named hydrophilic polymers, it is expected that any hydrophilic polymer will be useful in this invention provided that when said polymer is added to a formulation, the hydrophilic polymer (a) does not substantially phase separate from the reaction mixture and (b) imparts wettability to the resulting cured polymer. In some embodiments it is preferred that the hydrophilic polymer be soluble in the diluent at reaction temperatures.

Compatibilizing agents may also be used. In some embodiments the compatibilizing component may be any functionalized silicone containing monomer, macromer or prepolymer which, when polymerized and/or formed into a final article is compatible with the selected hydrophilic components. The compatibility test disclosed in WO03/022321 may be used to select suitable compatibilizing agents. In some embodiments, a silicone monomer, prepolymer or macromer which also comprises hydroxyl groups is included in the reactive mixture. Examples include 3-methacryloxy-2-hydroxypropyloxy)propylbis(trimethyl siloxy) methylsilane, mono-(3-methacryloxy-2-hydroxypropyloxy) propyl terminated, mono-butyl terminated polydimethylsiloxane (MW 1100), hydroxyl functionalized silicone containing GTP macromers, hydroxyl functionalized macromers comprising polydimethyl siloxanes, combinations thereof and the like. In another embodiment, the non-reactive hydrophilic polymers of the present application may be used as compatibilizing components.

In certain embodiments another hydroxyl containing component which does not include at least one silicone group is also included. The hydroxyl containing component that may be used to make the polymers of this invention have at least one polymerizable double bond and at least one hydrophilic functional group comprising at least one hydroxyl group. Examples of polymerizable double bonds include (meth)acrylic, (meth)acrylamido, fumaric, maleic, styryl, isopropenylphenyl, O-vinylcarbonate, O-vinylcarbamate, allylic, O-vinylacetyl and N-vinyllactam and N-vinylamido double bonds. The hydroxyl group may be a primary, secondary or tertiary alcohol group, and may be located on an alkyl or aryl group. Examples of hydroxyl containing monomers that may be used include but are not limited to 2-hydroxyethyl methacrylate ("HEMA"), 2-hydroxyethyl acrylate, 2-hydroxyethyl methacrylamide, 2-hydroxyethyl acrylamide, N-(2-hydroxyethyl)-O-vinyl carbamate, 2-hydroxyethyl vinyl carbonate, 2-hydroxypropyl methacrylate, hydroxyhexyl methacrylate, hydroxyoctyl methacrylate and other hydroxyl functional monomers as disclosed in U.S. Pat. Nos. 5,006,622; 5,070,215; 5,256,751 and 5,311,223.

The hydroxyl containing component may also act as a crosslinking agent.

In some embodiments the hydrophilic components include 2-hydroxyethyl methacrylate. In certain embodiments, at least about 3 weight % HEMA, at least about 5 weight % HEMA, and in some embodiments at least about 6 weight % HEMA is included in the reactive mixture.

It is generally necessary to add one or more cross-linking agents, also referred to as cross-linking monomers, to the reaction mixture, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other poly(meth)acrylate esters, such as the end-capped polyoxyethylene polyols described above containing two or more terminal methacrylate moieties. The cross-linking agents are used in the usual amounts, e.g., from about 0.000415 to about 0.0156 mole per 100 grams of reactive components in the reaction mixture. Alternatively, if the hydrophilic monomers and/or the silicone containing monomers act as the cross-linking agent, the addition of a cross-linking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone containing monomer which can act as a crosslinking agent and, when present, does not require the addition of a crosslinking monomer to the reaction mixture includes α,ω-bismethacryloypropyl polydimethylsiloxane.

The reaction mixture may contain additional components such as, but not limited to, UV absorbers, photochromic compounds, pharmaceutical and nutriceutical compounds, antimicrobial compounds, reactive tints, pigments, copolymerizable and nonpolymerizable dyes, release agents and combinations thereof.

Generally the reactive components are mixed in a diluent to form a reaction mixture. Suitable diluents are known in the art. For silicone hydrogels suitable diluents are disclosed in WO 03/022321, U.S. Pat. No. 6,020,445 the disclosure of which is incorporated herein by reference.

Classes of suitable diluents for silicone hydrogel reaction mixtures include alcohols having 2 to 20 carbons, amides having 10 to 20 carbon atoms derived from primary amines and carboxylic acids having 8 to 20 carbon atoms. In some embodiments primary and tertiary alcohols are preferred. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)propylbis(trimethylsiloxy) methylsilane, 1-tert-butoxy-2-propanol, 3,3-dimethyl-2-butanol, tert-butoxy ethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Suitable diluents for non-silicone containing reaction mixtures include glycerin, ethylene glycol, ethanol, methanol, ethyl acetate, methylene chloride, polyethylene glycol, polypropylene glycol, low molecular weight PVP, such as disclosed in U.S. Pat. Nos. 4,018,853, 4,680,336 and 5,039,459, including, but not limited to boric acid esters of dihydric alcohols, combinations thereof and the like.

Mixtures of diluents may be used. The diluents may be used in amounts up to about 55% by weight of the total of all components in the reaction mixture. More preferably the diluent is used in amounts less than about 45% and more preferably in amounts between about 15 and about 40% by weight of the total of all components in the reaction mixture.

A polymerization initiator is preferably included in the reaction mixture. The polymerization initiators includes compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and the preferred method of polymerization initiation is visible light. The most preferred is bis(2,4,6-trimethylbenzoyl)-phenyl phosphine oxide (Irgacure 819®).

The preferred range of silicone-containing monomer present in the reaction mixture is from about 5 to 95 weight percent, more preferably about 30 to 85 weight percent, and most preferably about 45 to 75 weight percent of the reactive components in the reaction mixture. The preferred range of hydrophilic monomer present in the above invention is from about 5 to 80 weight percent, more preferably about 10 to 60 weight percent, and most preferably about 20 to 50 weight percent of the reactive components in the reaction mixture. The preferred range of diluent present in the above invention is from about 2 to 70 weight percent, more preferably about 5 to 50 weight percent, and most preferably about 15 to 40 weight percent of the total reaction mixture (including reactive and nonreactive components).

Preferred combinations of reactive components and diluents are those having from about 25 to about 55 weight % silicone-containing monomer, about 20 to about 40 weight % hydrophilic monomer, from about 5 to about 20 weight % of an hydroxyl containing component, from about 0.2 to about 3 weight % of a crosslinking monomer, from about 0 to about 3 weight % of a UV absorbing monomer, from about 2 to about 10 weight % of an acyclic polyamide (all based upon the weight % of all reactive components) and about 20 to about 50 weight % (weight % of all components, both reactive and non-reactive) of one or more of the claimed diluents.

The reaction mixtures of the present invention can be formed by any of the methods known to those skilled in the art, such as shaking or stirring, and used to form polymeric articles or devices by known methods.

For example, the biomedical devices of the invention may be prepared by mixing reactive components and the diluent (s) with a polymerization initiator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spin-casting and static casting. Spincasting methods are disclosed in U.S. Pat. Nos. 3,408,429 and 3,660,545, and static casting methods are disclosed in U.S. Pat. Nos. 4,113,224 and 4,197,266. The preferred method for producing contact lenses comprising the polymer of this invention is by the molding of the silicone hydrogels, which is economical, and enables precise control over the final shape of the hydrated lens. For this method, the reaction mixture is placed in a mold having the shape of the final desired silicone hydrogel, i.e., water-swollen polymer, and the reaction mixture is subjected to conditions whereby the monomers polymerize, to thereby produce a polymer/diluent mixture in the shape of the final desired product. Then, this polymer/diluent mixture is treated with a solvent to remove the diluent and ultimately replace it with water, producing a silicone hydrogel having a final size and shape which are quite similar to the size and shape of the original molded polymer/diluent article. This method can be used to form contact lenses and is further described in U.S. Pat. Nos. 4,495,313; 4,680,336; 4,889,664; and 5,039,459, incorporated herein by reference.

The biomedical devices, and particularly ophthalmic lenses of the present invention have a balance of properties which makes them particularly useful. Such properties include clarity, water content, oxygen permeability and contact angle. The incorporation of at least one non-reactive hydrophilic polymer according to the present invention provides articles having very desirable contact angles and improve biometric performance as evidenced by reduced lipocalin, lipid and mucin uptake levels. Silicone hydrogel contact lenses incorporating the non-reactive hydrophilic polymers of the present invention display contact angles of less than about 50° and in some embodiments less than about 40°, and decreases in contact angle of 40% and in some embodiments 50% or more. Similarly, lipocalin can be lowered by 30% or more and silicone hydrogel lenses having about 2 μg or less may be produced. Mucin uptake levels may be reduced by at least about 10%, and in some embodiments at least about 20%. Lipid uptake can be lowered by 50% or more and silicone hydrogel lenses having about 15 μg or less may be produced. The silicone hydrogel lenses incorporating the hydrophilic polymers of the present invention display mucin uptake levels of about 4 μg or less.

In one embodiment, the biomedical devices are contact lenses having a water content of greater than about 17%, preferably greater than about 20% and more preferably greater than about 25%.

As used herein clarity means substantially free from visible haze. Preferably clear lenses have a haze value of less than about 150%, more preferably less than about 100%.

Suitable oxygen permeabilities for silicone containing lenses are preferably greater than about 40 barrer and more preferably greater than about 60 barrer.

In some embodiments the articles of the present invention have combinations of the above described oxygen permeability, water content and contact angle. All combinations of the above ranges are deemed to be within the present invention.

The non-limiting examples below further describe this invention.

Wettability of lenses was determined using a sessile drop technique measured using KRUSS DSA-100 ™ instrument at room temperature and using DI water as probe solution. The lenses to be tested (3-5/sample) were rinsed in DI water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface on contact lens plastic moulds. The plastic mould and the lens were placed in the sessile drop instrument holder, ensuring proper central syringe alignment and that the syringe corresponds to the assigned liquid. A 3 to 4 microliter of DI water drop was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds and the contact angle was computed based on the contact angle measured between the drop image and the lens surface.

The water content may be measured as follows: lenses to be tested were allowed to sit in packing solution for 24 hours. Each of three test lens were removed from packing solution using a sponge tipped swab and placed on blotting wipes which have been dampened with packing solution. Both sides of the lens were contacted with the wipe. Using tweezers, the test lens were placed in a weighing pan and weighed. The two more sets of samples were prepared and weighed as above. The pan was weighed three times and the average is the wet weight.

The dry weight was measured by placing the sample pans in a vacuum oven which has been preheated to 60° C. for 30 minutes. Vacuum was applied until at least 0.4 inches Hg is attained. The vacuum valve and pump were turned off and the lenses were dried for four hours. The purge valve was opened and the oven was allowed reach atmospheric pressure. The pans were removed and weighed. The water content was calculated as follows:

Wet weight=combined wet weight of pan and lenses−weight of weighing pan

Dry weight=combined dry weight of pan and lens−weight of weighing pan $$\% \text{ water content} = \frac{(\text{wet weight} - \text{dry weight})}{\text{wet weight}} \times 100$$

The average and standard deviation of the water content are calculated for the samples are reported.

Haze may measured by placing a hydrated test lens in borate buffered saline in a clear 20×40×10 mm glass cell at ambient temperature above a flat black background, illuminating from below with a fiber optic lamp (Titan Tool Supply Co. fiber optic light with 0.5" diameter light guide set at a power setting of 4-5.4) at an angle 66° normal to the lens cell, and capturing an image of the lens from above, normal to the lens cell with a video camera (DVC 1300C:19130 RGB camera with Navitar TV Zoom 7000 zoom lens) placed 14 mm above the lens platform. The background scatter is subtracted from the scatter of the lens by subtracting an image of a blank cell using EPIX XCAP V 1.0 software. The subtracted scattered light image is quantitatively analyzed, by integrating over the central 10 mm of the lens, and then comparing to a −1.00 diopter CSI Thin Lens®, which is arbitrarily set at a haze value of 100, with no lens set as a haze value of 0. Five lenses are analyzed and the results are averaged to generate a haze value as a percentage of the standard CSI lens.

Oxygen permeability (Dk) may be determined by the polarographic method generally described in ISO 9913-1: 1996(E), but with the following variations. The measurement is conducted at an environment containing 2.1% oxygen. This environment is created by equipping the test chamber with nitrogen and air inputs set at the appropriate ratio, for example 1800 ml/min of nitrogen and 200 ml/min of air. The t/Dk is calculated using the adjusted $p_{O2}$. Borate buffered saline was used. The dark current was measured by using a pure humidified nitrogen environment instead of applying MMA lenses. The lenses were not blotted before measuring. Four lenses were stacked instead of using lenses of varied thickness. A curved sensor was used in place of a flat sensor. The resulting Dk value is reported in barrers.

Lipocalin uptake was measured using the following solution and method. The lipocalin solution contained B Lactoglobulin (Lipocalin) from bovine milk (Sigma, L3908) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using the lipocalin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lipocalin solution. Each lens was fully immersed in the solution. Control lenses were prepared using PBS as soak solution instead of lipocalin. The plates containing the lenses immersed in lipocalin solution as well as plates containing control lenses immersed in PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Lipocalin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lipocalin solution. Optical density was measured using a SynergyII Micro-plate reader capable for reading optical density at 562 nm.

Mucin uptake was measured using the following solution and method. The Mucin solution contained Mucins from bovine submaxillary glands (Sigma, M3895-type 1-S) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using Mucin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of Mucin solution. Each lens was fully immersed in the solution. Control lenses were prepared using PBS as soak solution instead of lipocalin.

The plates containing the lenses immersed in Mucin as well as plates containing control lenses immersed in PBS were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Mucin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in Mucin solution. Optical density was measured using a SynergyII Micro-plate reader capable for reading optical density at 562 nm.

Cell viability was evaluated in vitro using a reconstituted corneal epithelium tissue construct. The tissue construct was a full thickness corneal epithelium (corneal epitheliam tissue from Skinethics) reconstituted and grown in vitro on a polycarbonate insert at the air liquid interface to form a fully stratified epithelial construct.

For the evaluation of lenses a punch biopsy (0.5 cm$^2$) of the lens was applied topically onto the tissue followed by a 24 hour incubation at 37° C., 5% $CO_2$. The lens biopsy was removed, and tissue was washed with PBS. Cell viability was then measured using the MTT colorimetric assay (Mosman, T. Rapid colorimetric assay for cellular growth and survival: application to proliferation and cytotoxicity assays. J. Immunol. Methods, 65; 55-63 (1983)): tissues were incubated in the presence of MTT for 3 hours at 37° C., 5% $CO_2$, followed by extraction of the tissues in isopropyl alcohol. Absorbance of the isopropyl alcohol extracts was then measured at 550 nm using a microplate reader. Results were expressed as a percentage of the PBS control (tissues treated with PBS versus lens-treated tissues).

For the evaluation of solutions 30 μg of solution was applied topically onto the tissue. The rest of the cell viability was as described for lenses. Each evaluation was done in triplicate.

Lipid uptake was measured as follows:

A standard curve was set up for each lens type under investigation. Tagged cholesterol (cholesterol labeled with NBD ([7-nitrobenz-2-oxa-1,3-diazol-4-yl], CH-NBD; Avanti, Alabaster, Ala.)) was solubilized in a stock solution of 1 mg/mL lipid in methanol at 35° C. Aliquots were taken from this stock to make standard curves in phosphate-buffered saline (PBS) at pH 7.4 in a concentration range from 0 to 100 micg/mL.

One milliliter of standard at each concentration was placed in the well of a 24-well cell culture plate. 10 lenses of each type were placed in another 24-well plate and soaked alongside the standard curve samples in 1 mL of a concentration of 20 micg/ml of CH-NBD. Another set of lenses (5 lenses) were soaked in PBS without lipids to correct for any autofluorescence produced by the lens itself. All concentrations were made up in phosphate buffered saline (PBS) at pH 7.4. Standard curves, test plates (containing lenses soaked in CH-NBD) and control plates (containing lenses soaked in PBS) were all wrapped in aluminum foil to maintain darkness and were incubated for 24 hours, with agitation at 35.C. After 24 hours the standard curve, test plates and control plates were removed from the incubator. The standard curve plates were immediately read on a micro-plate fluorescence reader (Synergy HT)).

The lenses from the test and control plates were rinsed by dipping each individual lens 3 to 5 times in 3 consecutive vials containing approximately 100 ml of PBS to ensure that only bound lipid would be determined without lipids carryover. The lenses were then placed in a fresh 24-well plate containing 1 mL of PBS in each well and read on the fluorescence reader. After the test samples were read, the PBS was removed, and 1 mL of a fresh solution of CH-NBD were placed on the lenses in the same concentrations as previously mentioned and placed back in the incubator at 35° C., with rocking, until the next period. This procedure was repeated for 15 days until complete saturation of lipids on lenses. Only the lipid amount obtained at saturation was reported Lysozyme uptake was measured as follows: The lysozyme solution used for the lysozyme uptake testing contained lysozyme from chicken egg white (Sigma, L7651) solubilized at a concentration of 2 mg/ml in phosphate saline buffer supplemented by Sodium bicarbonate at 1.37 g/l and D-Glucose at 0.1 g/l.

The lipocalin solution contained B Lactoglobulin (Lipocalin) from bovine milk (Sigma, L3908) solubilized at a concentration of 2 mg/ml in phosphate saline buffer supplemented by Sodium bicarbonate at 1.37 g/l and D-Glucose at 0.1 g/l.

Three lenses for each example were tested using each protein solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lysozyme solution. Each lens was fully immersed in the solution. 2 ml of the lysozyme solution was placed in a well without a contact lens as a control.

The plates containing the lenses and the control plates containing only protein solution and the lenses in the PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile conical tubes (1 lens per tube), each tube containing a volume of PBS determined based upon an estimate of lysozyme uptake expected based upon on each lens composition. The lysozyme concentration in each tube to be tested needs to be within the albumin standards range as described by the manufacturer (0.05 micogram to 30 micrograms). Samples known to uptake a level of lysozyme lower than 100 μg per lens were diluted 5 times. Samples known to uptake levels of lysozyme higher than 500 μg per lens (such as etafilcon A lenses) are diluted 20 times.

1 ml aliquot of PBS was used for all samples other than etafilcon. 20 ml were used for etafilcon A lens. Each control lens was identically processed, except that the well plates contained PBS instead of either lysozyme or lipocalin solution.

Lysozyme and lipocalin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lysozyme solution.

Optical density was measured using a SynergyII Microplate reader capable for reading optical density at 562 nm.

PQ1 uptake was measured as follows: PQ1 uptake was measured as follows. The HPLC is calibrated using a series of standard PQ1 solutions prepared having the following concentrations: 2, 4, 6, 8, 12 and 15 μg/mL. Lenses were placed into polypropylene contact lens case with 3 mL of Optifree Replenish (which contains 0.001 wt % PQ1, and is commercially available from Alcon). A control lens case, containing 3 mL of solution, but no contact lens was also prepared. The lenses and control solutions were allowed to sit at room temperature for 72 hours. 1 ml of solution was removed from each of the samples and controls and mixed with trifluoroacetic acid (10 μL). The analysis was conducted using HPLC/ELSD and a Phenomenex Luna C4 (4.6 mm×5 mm; 5 μm particle size) column and the following conditions Instrument: Agilent 1200 HPLC or equivalent with Sedere Sedex 85 ELSD
Sedex 85 ELSD: T=60° C., Gain=10, Pressure=3.4 bar, Filter=1 s
Mobile Phase A: $H_2O$ (0.1% TFA)
Mobile Phase B: Acetonitrile (0.1% TFA)
Column Temperature: 40° C.
Injection Volume: 100 μL

TABLE I

HPLC Conditions.

| Time (minutes) | % A | % B | Flow Rate (mL/min) |
|---|---|---|---|
| 0.00 | 100 | 0 | 1.2 |
| 1.00 | 100 | 0 | 1.2 |
| 5.00 | 5 | 100 | 1.2 |
| 8.50 | 5 | 100 | 1.2 |
| 8.60 | 100 | 0 | 1.2 |
| 11.00 | 100 | 0 | 1.2 |

Three lenses were run for each analysis, and the results were averaged.

Lens parameters, including base curve, diameter, power and CT were measured as follows. Diameter and power were measured using a Mach-Zehnder interferometer with the lenses submersed in saline solution and mounted concave surface down in a cuvette, as further described in US2008/0151236. The lenses were equilibrated for 15 minutes at about 20° C. before measurement. The interferometer output is the interference between two beams of wavefront of the tested contact lens.

Sagittal depth and CT are measured using GE Panametrics 25 Multi Plus Ultrasonic Thickness gauge. The gauge measures the sagittal depth and center thickness of the lens from the measurement of ultrasonic pulses from a transducer. The pulses are reflected by the lens to the transducer. The base curve radius of the contact lens was calculated based on the sagittal depth and the lens diameter. Lenses were equilibrated in the Panametrics 25 Multi Plus bowl for at least 15 seconds prior to measurement. Lens were placed concave down and centered on the full sagittal lens holder before CT and sagittal depth measurements.

The following abbreviations will be used throughout the Examples and have the following meanings.
ACA1 3-acrylamidopropionic acid, as prepared in Preparation 22
ACA2 5-acrylamidopentanoic acid, as prepared in Preparation 23
BBB 4-(bromomethyl)benzoyl bromide (Sigma-Aldrich)
Irgacure-819 bis(2,4,6-trimethylbenzoyl)-phenylphosphineoxide (Ciba Specialty Chemicals)
KX potassium O-ethyl xanthogenate
mPDMS monomethacryloxypropyl terminated mono-n-butyl terminated polydimethylsiloxanes (800-1000 MW
NaHTTC sodium hexyltrithiocarbonate
XG1996TTC S-hexyl-S'-4-(2-(n-butylpolydimethylsiloxydimethylsilyl)ethyl)benzyl carbonotrithioate
nBPDMS-H 3-(n-butyltetramethylsiloxydimethylsilyl) propanol (prepared and shown in Preparation 1)
NVP N-vinylpyrrolidone (Acros Chemical), further purified via vacuum distillation
NRPTHP non-reactive polysiloxane terminated hydrophilic polymer produced in Preparation 3
HO-mPDMS mono-(2-hydroxy-3-methacryloxypropyl)-propyl ether terminated polydimethylsiloxane (400-1000 MW))
SBX 3-(n-butyltetramethylsiloxydimethylsilyl)propyl 4-((ethoxycarbonothioylthio)methyl)benzoate (prepared in Preparation 2)
SiGMA 2-methyl-,2-hydroxy-3-[3-[1,3,3,3-tetramethyl-1-[(trimethylsilyl)oxy]disiloxanyl]propoxy]propyl ester
TRIS-VC tris(trimethylsiloxy)silylpropyl vinyl carbamate
$V_2D_{25}$ a silicone-containing vinyl carbonate describe at col. 4, lines 33-42 of U.S. Pat. No. 5,260,000
XG-1996 4-(2-(n-butylpolydimethylsiloxydimethylsilyl)ethyl)benzyl chloride, MW~1000 g/mole, (structure shown in Preparation 5)
D3O 3,7-dimethyl-3-octanol Preparation 1

Hydrosilylation of Allyl Alcohol to nBPDMS

In a 3 neck round-bottom flask under $N_2$ was added nBPDMS-H (73 g, 0.18 moles, PTG lot#1708682.001) and allyl alcohol (48 g, 0.83 moles, Fluka lot#127884154306205). The temperature of the mixture was reduced to 0° C. with an ice bath and 500 microL of Karlstedt's Catalyst (Aldrich 01231) containing 2 wt % platinum in xylene. The ice bath was removed after 5 minutes and the mixture was allowed to reach room temperature. An exotherm was observed and the temperature reached a maximum of 64° C. in a few minutes. The reaction mixture was then cooled in a water bath and left to react for an additional 48 hours. The residual allyl alcohol was removed via roto-evaporation under reduced pressure. The oily liquid was filtered through a small silica plug to recover/remove the platinum catalyst.

Preparation 2

Synthesis of 3-(n-butyltetramethylsdoxydimethylsilyl)propyl 4-((ethoxycarbonothioylthio)methyl)benzoate (SBX)

To a 100 mL round-bottom flask was added 4.71 g (10.0 mMoles) nBSP, 3.0 g (10.5 mMoles) BBB, 1.27 g (10.0 mMoles) $Li_2CO_3$, and 20 mL $CH_3CN$. The solution was stirred at room-temperature for 20 hours and subsequently filtered. The clear filtrate was then further reacted with 1.65 g (10 mMoles) of potassium O-ethyl xanthogenate (KX) for 3 hours until a reddish-orange solution was obtained. Toward the end of the reaction, a solid precipitate (KBr) was formed at the bottom of the flask. The mixture was transferred to a separatory funnel and water and hexanes were added to extract water-soluble impurities. The aqueous phase was removed and washed twice with fresh hexane before discarding. All three hexane phases were combined and dried over anhydrous $Na_2SO_4$. The resulting solution was filtered and reduced to a reddish-brown oily liquid via rotary evaporation. The compound structure was confirmed via $^1$H NMR (300 MHz, $CDCl_3$): δ (ppm) 0.0 (m, ~30H), 0.4-0.6 (m, 4H), 0.8-0.9 (t, 3H), 1.2-1.3 (m, 4H), 1.4 (t, 3H) 1.6-1.8 (m, 3H), 4.2 (t, 2H). The reaction is shown below.

Reaction Scheme III

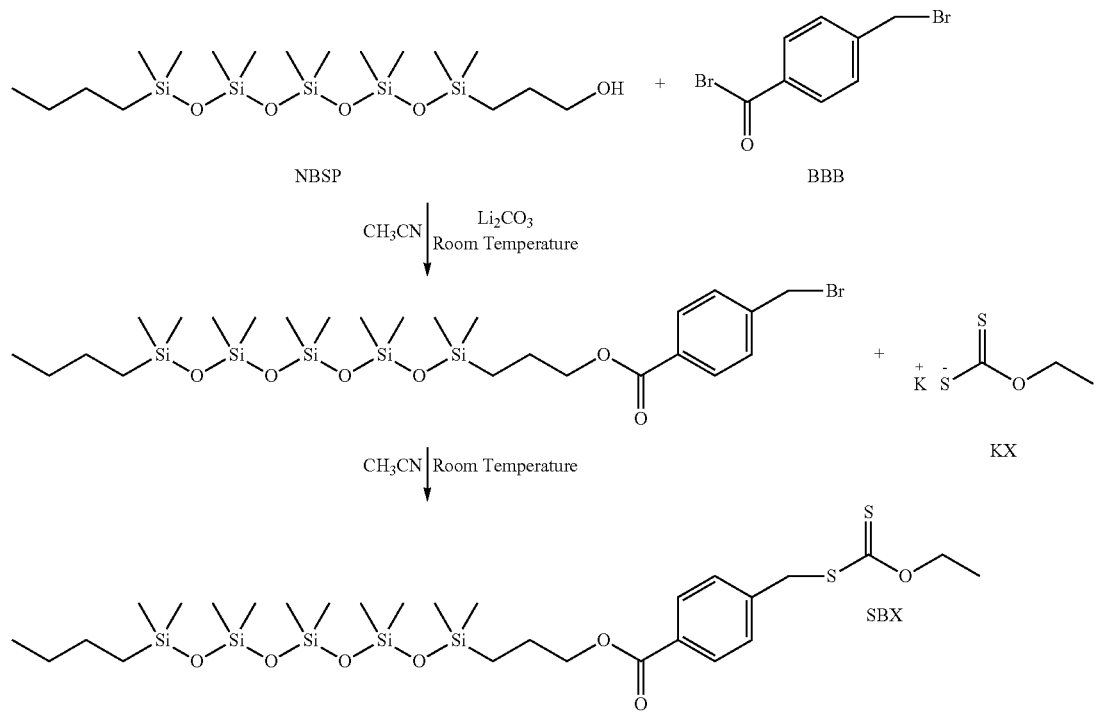

Preparation 3

Synthesis of PVP-Based Non-Reactive Polysiloxane Terminated Hydrophilic Polymer NRPTHP in the Presence of SBX A polymerization solution was prepared with a [NVP]:[SBX] ratio of 300:1 and an [SBX]:[Irgacure-819] ratio of 5:1. Generally, the solution was prepared by adding 50 g distilled NVP to a 100 mL amber jar. Next, 1.063 g of SBX and 125 mg Irgacure-819 were added to the monomer and stirred to ensure homogeneity. The amber jar containing the final polymerization solution was sealed with a rubber septum and purged for 30 minutes with $N_2$ to remove $O_2$ from the solution. Finally, the sealed jar was placed in an $N_2$ glove-box for storage overnight.

The polymerization solution was cured under an $N_2$ atmosphere with 4 standard Phillips TL 20 W/03 RS bulbs at intensity of 2.0 mW/cm$^2$ for 3 hours. Prior to curing, the polymerization solution was poured into a crystallization dish, which was then placed on a reflective glass surface. The reaction scheme is shown below in Reaction Scheme 4.

Reaction Scheme IV

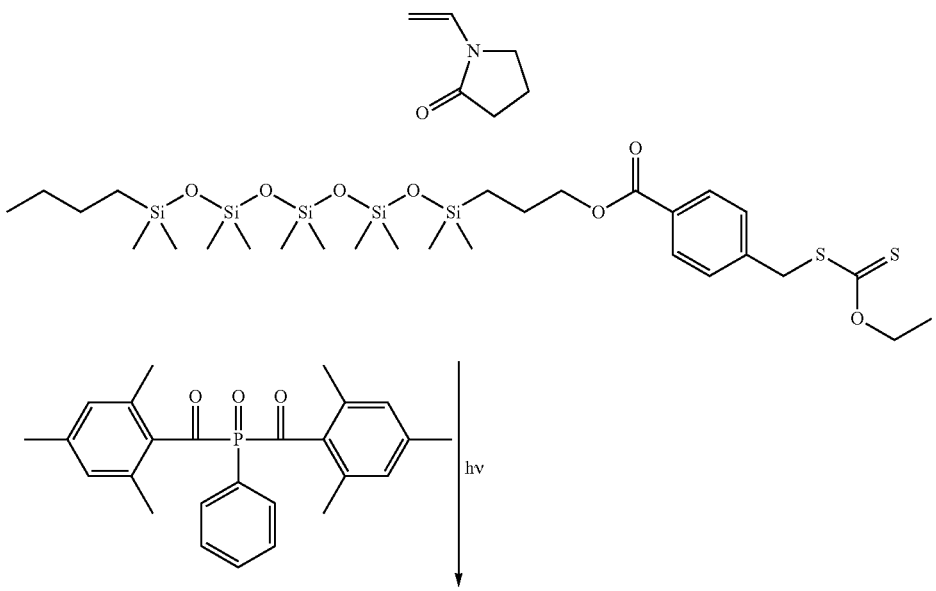

-continued

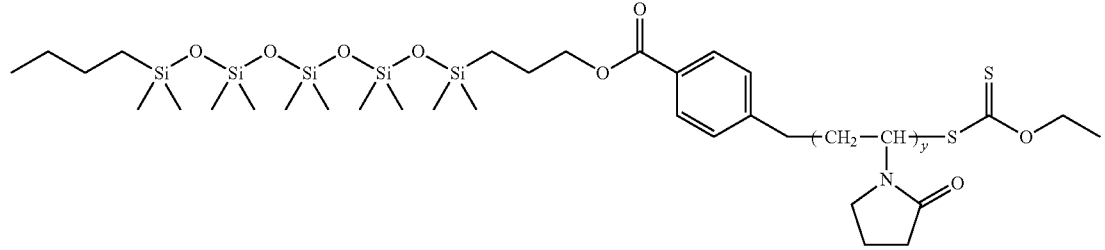

After curing for 3 hours, the resulting glassy polymerized material was removed from the crystallization dish, a small portion was retained for ¹H NMR analysis, and the remaining material was dissolved in 180 mL of ethanol. The solution was stirred overnight and precipitated from diethyl ether the next morning. Monomer conversion and purity of the retained (non-purified) polymer and final precipitated polymer, respectively, were confirmed via ¹H NMR spectroscopy in CDCl₃. The NMR data revealed that the polymerization reached a conversion of 93% over a three hour period. The precipitated polymer showed very little NVP present; however, residual diethyl-ether was present. Absolute MW of the polymer was determined via Size Exclusion Chromatography with Multi-Angle Laser Light Scattering (SEC-MALLS) to be around 42,000 g/mole (Table 1).

TABLE 1

| $M_n$ (g/mole) | $M_w$ (g/mole) | Polydispersity |
|---|---|---|
| 41,800 | 46,830 | 1.12 |

SEC-MALLS Characterization of Preparation 3

The SEC-MALLS setup employed an aqueous/organic co-eluent composed of 80% 0.05 M Na₂SO₄ and 20% CH₃CN at a flow rate of 0.5 mL/min at 40° C., Tosoh Biosciences TSK-gel columns (SuperAW3000 (Exclusion Limit <60 000 g/mole, 150 Å) and a SuperAW4000 (Exclusion Limit <400,000 g/mol, 450 Å)) with an online Agilent 1200 UV/vis diode array detector, Wyatt Optilab rEX interferometric refractometer, and a Wyatt miniDAWN Treos multiangle laser light scattering (MALLS) detector (λλ=658 nm). The d'q/dc of 0.155 mL/g at 30° C. (λ=658 nm) for poly(vinyl pyrrolidone) was used for absolute molecular weight determination. Absolute molecular weights and polydispersity data were calculated using the Wyatt ASTRA V SEC/LS software package. The results are shown at FIG. 1.

Examples 1-10

The following commercially available silicone hydrogel contact lenses were measured to determine contact angle and lipocalin uptake using the methods described above. Lenses of each type were removed from their packages and transferred glass vials containing packing solution containing the non-reactive polysiloxane terminated hydrophilic polymer produced in Preparation 3 ("NRPTHP") in the amount shown in Table 2. Lenses re-packaged in the NRPTHP packing solution, were autoclaved at 121° C. for 28 minutes and, after sterilization, were allowed to soak in the NRPTHP packing solution at ambient temperature for time listed in Table 2. Contact angle measured via the sessile drop procedure described above, and lipocalin uptake were measured and the data is reported in Table 2.

TABLE 2

| Ex. | Lens Type | [NRPTHP] (ppm) | Soak (days) | Contact angle (°) | [lipocalin] (μg/lens) |
|---|---|---|---|---|---|
| 1 | AO | 0 | NA | 72 + 6 | 3.4 + 0.1 |
| 2 | AO | 150 | 2 | 38 + 14 | 1.9 + 0.2 |
| 3 | AO | 150 | 14 | 32 + 10 | 2.0 + 0.1 |
| 4 | AO | 3000 | 2 | 36 + 4 | 2.0 + 0.2 |
| 5 | AA | 0 | NA | 91 + 4 | 7.0 + 0.1 |
| 6 | AA | 3000 | 2 | 55 + 7 | 4.8 + 0.3 |
| 7 | ATE | 0 | NA | 98 + 3 | 7.3 + 0.1 |
| 8 | ATE | 3000 | 2 | 53 + 7 | 5.1 + 0.2 |
| 9 | PV | 0 | NA | 91 + 4 | 7.9 + 0.4 |
| 10 | PV | 3000 | 2 | 41 + 8 | 4.6 + 0.5 |

AO = ACUVUE OASYS with Hydraclear Plus (senofilcon), commercially available from Johnson & Johnson Vision Care, Inc.
AA = ACUVUE ADVANCE with Hydraclear (galyfilcon), commercially available from Johnson & Johnson Vision Care, Inc.
ATE = ACUVUE TrueEye with Hydraclearl (narafilcon), commercially available from Johnson & Johnson Vision Care, Inc.
PV = PUREVISION (balafilcon), commercially available from Bausch & Lomb When compared to an untreated senofilcon A substrate (Example 1), lenses treated with a non-reactive polysiloxane terminated hydrophilic polymer of the present invention display significantly improved wettability, as evidenced by lowered sessile drop values, and also have improved biometric performance, as evidenced by lowered lipocalin uptake levels. The ACUVUE OASYS lenses were evaluated at three different sets of concentration/soak conditions (Examples 2-4) and all Examples displayed significantly decreased contact angles (reductions of at least 40%) and lipocalin uptake (reductions of at least about 35%). For all solutions and exposure times tested (i.e. 3000 vs. 150 ppm and 2 vs. 14 days), there are no discernable differences in wettability or lipocalin uptake in the lenses treated according to the present invention.

It is important to note that the lipocalin values for the NRPTHP treated lenses approach those of etafilcon A and the lower limit of detection for the assay.

Three other silicone hydrogel lens types (ACUVUE ADVANCE with Hydraclear (galyfilcon), commercially available from Johnson & Johnson Vision Care, Inc., ACUVUE TrueEye with Hydraclearl (narafilcon), commercially available from Johnson & Johnson Vision Care, Inc., and PUREVISION (balafilcon), commercially available from Bausch & Lomb) were tested using the conditions of Example 4. For all substrates, both the sessile drop contact angle and lipocalin uptake were decreased significantly. For senofilcon A, galyfilcon A, narafilcon A, and balafilcon A treated with 3000 ppm PVP/Sil, the following respective percent reductions in contact angle and lipocalin uptake were observed: senofilcon A, 50.2 and 41.4%; galyfilcon A, 40.1 and 31.0%; narafilcon A, 45.8 and 31.0%; and balafilcon A, 55.2 and 42%. This data is particularly interesting as the lenses have a range of properties as shown by Table 3, below.

TABLE 3

| Lens type | SiO component | [Si] wt % dry polymer | % water | Coated? |
|---|---|---|---|---|
| AO | SiGMA, mPDMS | 15.3 | 38 | No |
| AA | SiGMA, mPDMS | 12.5 | 47 | No |
| ATE | HO-mPDMS | 12.6 | 46 | No |
| PV | TRIS-VC,$V_2D_{25}$ | 19.4 | 36 | Yes |

The lenses of Examples 1, 2, and 4, were measured to check parameters. The results (base curve, center thickness and diameter) are shown in Table 4, below.

TABLE 4

| Ex. # | BC (mm) | CT (mm) | Diameter (mm) | Power |
|---|---|---|---|---|
| 1 | 8.49 | 0.065 | 14.02 | −1.01 |
|  | (0.06) | (0.008) | (0.11) | (0.03) |
| 2 | 8.43 | 0.071 | 14.03 | −0.94 |
|  | (0.008) | (0.002) | (0.02) | (0.03) |
| 4 | 8.43 | 0.070 | 14.03 | −0.92 |
|  | (0.02) | (0.003) | (0.05) | (0.03) |

While the NRPTHP of the present invention has a substantial impact on wettability and in vitro performance of senofilcon A, the effect that it has on lens parameters is minimal, as shown by the data in Table 4, above. All parameters tested for NRPTHP-treated lenses display parameters which display values within the standard deviation of the parameter test methods as compare to the untreated lenses.

Examples 11-18

The control lenses from Examples 1, 5, 7 and 9 (senofilcon, galyfilcon, narafilcon and balafilcon lenses respectively) were placed in lens cases containing 3 ml of either Optifree RepleniSH multipurpose solution (commercially available from Alcon) or Optifree RepleniSH multipurpose solution containing 0.1% NRPTHP prepared in Preparation 3. The lens cases were closed and the lenses were allowed to soak at room temperature in the multipurpose solution for 24 hours. The contact angle and lipocalin uptake were evaluated using the methods described above, and the results are shown in Table 5, below. The results from Examples 1, 5, 7 and 9 (control lenses with no NRPTHP) and Examples 4, (incorporation of the NRPTHP in the packing solution prior to autoclaving) have been added to Table 5 for comparison.

TABLE 5

| Ex# | Lens | NRPTHP | MPS soak (hrs) | Contact Angle (°) | [lipocalin] (μg) |
|---|---|---|---|---|---|
| 1 | AO | No | 0 | 72 ± 6 | 3.4 ± 0.1 |
| 11 | AO | No | 24 | 71 ± 3 | 3.4 ± 0.1 |
| 12 | AO | Yes | 24 | 21 ± 4 | 2.2 ± 0.1 |
| 4 | AO | Yes-PS | 0 | 36 ± 4 | 2.0 ± 0.1 |
| 5 | AA | No | 0 | 91 ± 4 | 7.0 ± 0.1 |
| 13 | AA | No | 24 | 87 ± 5 | 6.8 ± 0.2 |
| 14 | AA | Yes | 24 | 60 ± 7 | 4.5 ± 0.4 |
| 6 | AA | Yes-PS | 0 | 55 ± 7 | 4.8 ± 0.3 |
| 7 | ATE | No | 0 | 98 ± 3 | 7.3 ± 0.1 |
| 15 | ATE | No | 24 | 95 ± 2 | 6.8 ± 0.2 |
| 16 | ATE | Yes | 24 | 57 ± 4 | 4.6 ± 0.3 |
| 8 | ATE | Yes-PS | 0 | 53 ± 7 | 5.1 ± 0.2 |
| 9 | PV | No | 0 | 91 ± 4 | 7.9 ± 0.4 |
| 17 | PV | No | 24 | 90 ± 4 | 7.4 ± 0.2 |
| 18 | PV | Yes | 24 | 45 ± 2 | 4.5 ± 0.4 |
| 10 | PV | Yes-PS | 0 | 41 ± 8 | 4.6 ± 0.5 |

PS-NRPTHP added in packing solution and autoclaved

Examples 11 through 18 were run to assess whether the NRPTHP could be incorporated into the contact lenses from a commercially available multipurpose solution, such as OptiFree RepleniSH. Comparing Examples 1, 5, 7 and 9 (control lenses) with Examples 11, 13, 15 and 17 (lenses not treated with NRPTHP, but soaked in MPS solution), it is clear that soaking in MPS solution has no impact on either the contact angle or lipocalin uptake of any of the lenses tested. However, the lenses of Examples 12, 14, 16 and 18 (soaked in MPS containing NRPTHP) show substantial improvements in in vitro performance, including improved wettability (decreased contact angles) and substantial decreases in lipocalin uptakes for all lens types when compared with the data for the lenses soaked in MPS without the NRPTHP (Examples 11, 13, 15 and 17). The contact angle and lipocalin uptake data obtained on lenses soaked in MPS supplemented by NRPTHP are similar to those obtained on the lenses which were repackaged in packing solution containing 3000 ppm NRPTHP and autoclaved (Examples 4, 6, 8 and 10).

Examples 19-22

Lenses from Examples 1 (control) and 4 (3000 ppm NRPTHP) were evaluated after being subjected to multiple rubbing cycles using Optifree RepleniSH multipurpose solution (commercially available from Alcon). For each cycle the lens was positioned "bowl up" on the index finger of the tester and 3-5 drops of the multipurpose solution was instilled into the bowl. The lens was then rubbed 8-10 times for each side between the thumb and index finger of the tester. At the end of each rub "cycle" the lens was rinsed with Optifree RepleniSH. The number of rub cycles to which each set of lenses was subjected is listed in Table 6. The contact angle and lipocalin uptake were measured as described above and the results are listed in Table 6, below.

TABLE 6

| Ex# | Lens | # of rub cycles | Contact angle (°) | Lipocalin uptake (μg) |
|---|---|---|---|---|
| 1 | Ex1 | 0 | 72 ± 6 | 3.4 ± 0.1 |
| 19 | Ex1 | 8 | 68 ± 4 | 3.3 ± 0.07 |
| 20 | Ex1 | 16 | 63 ± 6 | 3.2 ± 0.1 |
| 4 | Ex4 | 0 | 36 ± 4 | 2.0 ± 0.1 |
| 21 | Ex4 | 8 | 3 ± 1 | 1.7 ± 0.2 |
| 22 | Ex4 | 16 | 4 ± 1 | 1.6 ± 0.2 |

Comparing the results from Examples 1, 19 and 20, it can be see that rubbing a senofilcon lens with MPS results in insubstantial changes in either contact angle or lipocalin uptake values. However, Examples 21 and 22 (NRPTHP treated lenses subjected to 8 and 16 rubbing cycles) show an extraordinary ~90% decrease in contact angle from 36° degrees for Example 4 (NRPTHP-treated lenses, 0 rub cycles) to 3° and 4° degrees for Examples 21 and 22, respectively (NRPTHP-treated lenses with 8 or 16 rub cycles). Subjecting the lenses of the present invention to rub cycles with Optifree RepleniSH also further decreased the lipocalin uptake as well. The NRPTHP-treated lenses showed significantly lower lipocalin uptake with rubbing than without (1.7 and 1.6 for Examples 21 and 22 compared to 2.0 for Example 4).

Example 29

Three senofilcon lenses were removed from their packages Lenses and transferred glass vials containing packing solution containing 500 ppm of the non-reactive polysiloxane terminated hydrophilic polymer produced in Preparation 3 ("NRPTHP"). The lenses were re-packaged in the NRPTHP packing solution, autoclaved at 121° C. for 28 minutes and, after sterilization, were allowed to soak in the NRPTHP packing solution at ambient temperature for at least 24 hours. Mucin uptake for the NRPTHP treated lenses were measured, the results averaged and found to be 3.86+ 0.21 µg/lens. Three untreated senofilcon lenses were also tested and found to have 5.22+0.03 µg/lens average mucin uptake.

Example 30

A 1% solution of the NRPTHP of Preparation 3 in PBS was prepared. Some of the NRPTHP solution was autoclaved in a glass vial.

A senofilcon A lens was placed in a glass vial with 3 ml of a PBS/NRPTHP solution having a concentration of 0.1 wt % NRPTHP, the lens and solution were transferred to a polypropylene blister package, sealed and sterilized via autoclaving at 121° C. for 21 minutes. The cell viability of the PBS control solution, the PBS solution with NRPTHP, the PBS/NRPTHP solution after autoclaving and the contact lens autoclaved in the PBS/NRPTHP were measured. The results are shown in Table 7.

TABLE 7

| Test Sample | Cell viability (%) |
| --- | --- |
| PBS Control | 100 ± 4 |
| PBS/NRPTHP solution | 102 ± 2 |
| PBS/NRPTHP solution (autoclaved) | 84 ± 2 |
| PBS/NRPTHP lens | 99 ± 5 |

Cell viability above 80% correlates to comfort upon insertion in a human eye and minimal perturbation to the human epithelium. The data demonstrates that there is minimal perturbation of human corneal epithelial cells when exposed to high levels of the PRPTHP whether from a solution or a contact lens which has NRPTHP associated therewith.

Preparation 4

Synthesis of 3-(n-butyltetradimethylsiloxydimethylsilyl)propyl 4-((ethoxycarbonothioylthio)methyl) benzoate (SBX-D)

3-(n-butyltetramethylsiloxydimethylsilyl) propanol (4.71 g, 10 moles) was dissolved in 20 mL of hexane with TMP (1.42 g, 10 moles). 4-(bromomethyl)benzoyl bromide (BBB) (2.92 g, 10.5 moles) was added to the solution and a white solid formed immediately. The mixture was stirred over night and the precipitate was removed via filtration the following morning. Potassium O-ethyl xanthogenate (KX) (1.68 g, 10.5 moles) was then added to the filtered reaction mixture with a few mL of acetonitrile and the final mixture was allowed to stir overnight. The next morning, the mixture was filtered once again to remove residual unreacted KX. Hexane and water were added to the filtrate and the mixture was shaken in a separatory funnel. The aqueous layer was separated and extracted twice with hexane. All hexane layers were collected and dried over anhydrous $Na_2SO_4$. Solvent was removed by rotary evaporation and the final product, 3-(n-butyltetramethylsiloxydimethylsilyl)propyl 4-((ethoxycarbonothioylthio)methyl)benzoate (SBX-D, structure shown below) was isolated as an oil. The compound structure was confirmed via $^1$H NMR (300 MHz, $CDCl_3$): δ (ppm) 0.0 (m, 30H), 0.4-0.6 (m, 4H), 0.8-0.9 (t, 3H), 1.2-1.3 (m, 4H), 1.4 (t, 3H) 1.6-1.8 (m, 3H), 4.2 (t, 2H), 4.4 (s, 2H), 4.65 (q, 2H), 7.4 (d, 2H), 8.0 (d, 2H).

Formula XX

SBX-D:
3-(n-butyltetramethylsiloxydimethylsilyl)propyl
4-((ethoxycarbonothioylthio)methyl)benzoate

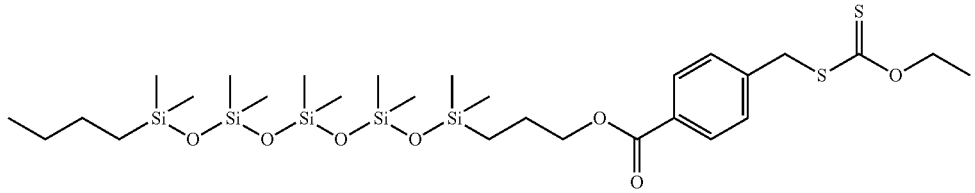 [SMILES: CCCC[Si](C)(C)O[Si](C)(C)O[Si](C)(C)O[Si](C)(C)O[Si](C)(C)CCCOC(=O)c1ccc(CSC(=S)OCC)cc1]

Preparation 5

Synthesis of O-ethyl S-4-(2-(n-butylpolydimethylsiloxydimethylsilyl)ethyl)benzyl carbonodithioate (XG-1996-XAN)

XG-1996 (shown in Formula XXI, below, MW distribution centered around about 1000 g/mole, which corresponds to an average repeat, m of 10-12), (10 g, 10 moles), was dissolved in approx. 40 mL of acetone in a 100 mL round bottom flask. Potassium O-ethyl xanthogenate (KX) was added and the resulting reaction mixture was stirred overnight. A white salt precipitated out of solution and the mixture was filtered to remove solids. The filtrate was concentrated via roto-evaporation. The crude product was a yellow oil and contained unreached solid KX. Deionizer water was added (approx. 40 mol), and the product (O-ethyl S-4-(2-(n-butylpolydimethylsiloxysilyl)ethyl)benzyl carbonodithioate, XG-1996-XAN, (structure shown in Formula XXII, below) was extracted with hexane (4×40 mol) and dried over $Na_2SO_4$. The hexane solution was roto-vapid to approximately half volume and passed over a silica gel plug. The plug was rinsed with hexane and all elements were combined and roto-vapid to dryness leaving a clear, pale yellow oil. The compound structure was confirmed via $^1$H NMR (300 MHz, $CDCl_3$): δ (ppm) 0.03-0.08 (m, 75H), 0.52 (t, 2H), 0.82-0.92 (m, 4H), 1.22-1.35 (m, 5H), 1.40 (t, 3H), 2.62 (t, 2H), 4.32 (s, 2H) 4.64 (q, 2H), 7.14 (d, 2H), 7.21 (d, 2H).

Formula XXI

XG-1996: -(2-(n-butylpolydimethylsiloxydimethylsilyl)ethyl)benzyl chloride MW~1000 g/mole

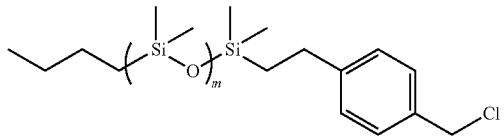

Formula XXII

XG-1996-XAN: O-ethyl S-4-(2-(n-butylpolydimethylsiloxydimethylsilyl)ethyl)benzyl carbonodithioate

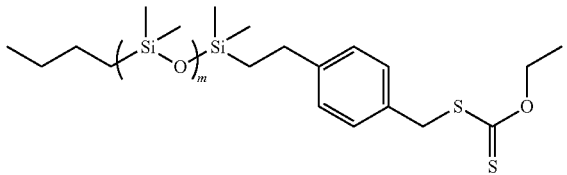

Preparation 6

Synthesis of PVP-Based Non-Reactive Polysiloxane Terminated Hydrophilic Polymer NRPTHP in the Presence of SBX-D Preparation 3 was repeated replacing the SBX from Preparation 2 with the SBX-D prepared in Preparation 4. The SBX-D made in Preparation 4, did not display the scrambling of the siloxane which occurred in Preparation 2. Because of the scrambling, the NRPTHP of Preparation 3 contains polysiloxane segments with different numbers of polysiloxane units, whereas the NRPTHP of Preparation 6 contains polysiloxane segments, substantially all of which have 5 polysiloxane units. The polymer was analyzed via the same SEC-MALLS technique used to characterize Preparation 3 and was found to have a comparable MW to that of Preparation 3.

Preparation 7

Synthesis of PVP-Based Non-Reactive Polysiloxane Terminated Hydrophilic Polymer NRPTHP in the Presence of XG-1996-XAN Preparation 3 was repeated replacing the SBX from Preparation 2 with the XG-1996-XAN prepared in Preparation 5.

Examples 31-32

Three senofilcon lenses were removed from their packages and transferred glass vials containing packing solution containing 500 ppm of the non-reactive polysiloxane terminated hydrophilic polymer ("NRPTHP") produced in Preparation 3 or 6. The lenses were re-packaged in the NRPTHP packing solution, autoclaved at 121° C. for 28 minutes and, after sterilization, were allowed to soak in the NRPTHP packing solution at ambient temperature for at least 24 hours. The sessile drop contact angle of the lenses were measured and are reported in Table 8.

TABLE 8

| Ex. # | NRPTHP | Siloxane repeats | Pd | Contact angle |
|---|---|---|---|---|
| Control | None | NA | NA | 70 ± 6 |
| 31 | Prep. 6 | 5 | | 72 ± 6 |
| 32 | Prep 3 | ~5 | 1.12 | 49 ± 7 |

Example 31 showed no improvement in contact angle, while Example 32 showed substantial improvement compared to the untreated control. The NRPTHP of Preparation 3 had scrambled siloxane segments, which results in segments of varying length, while the NRPTHP of Preparation 6 displayed siloxane segments which did not undergo scrambling during the preparation, and retained a consistent number of polysiloxane units (5) in the polysiloxane segment. Comparing Examples 31 to 32, NRPTHP having 5 or fewer polysiloxane units in the polysiloxane segment do not provide any measurable improvement in wettability of a contact lens soaked in a solution containing the NRPTHP.

Example 33

Examples 32 was repeated, using the NRPTHP of Preparation 7 (average polysiloxane chain of about 10-12). The contact angles for lenses of Example 32, 34 were measured and are reported in Table 9 (along with the control, ACUVUE OASYS contact lenses which were not soaked in an NRPTHP).

TABLE 9

| Ex. # | NRPTHP | Siloxane repeats | Pd | Contact angle |
|---|---|---|---|---|
| Control | None | NA | NA | 79 ± 6 |
| 32 | Prep. 3 | ~5 | 1.12 | 38 ± 14 |
| 33 | Prep. 7 | ~10-12 | | 8 ± 6 |

Comparing Examples 32 to 33, incorporating polysiloxane segments which have greater than about 6 siloxane units further improves the wettability of the lenses and also increases the persistence of the improvement in wettability.

Preparation 8

Synthesis of S-hexyl-S'-4-(2-(n-butylpolydimethyl-siloxydimethylsilyl)ethyl)benzyl carbonotrithioate S-hexyl-S'-4-(2-(n-butylpolydimethylsiloxydimethylsilyl)ethyl)benzyl carbonotrithioate (XG1996TTC)

XG-1996 (shown in Formula XXI, MW distribution centered around about 1000 g/mole, which corresponds to an average repeat, m of 10-12), (10 g, 10 moles), was dissolved in approx. 250 mL of acetone in a 1 L round bottom flask. Sodium hexyltrithiocarbonate (NaHTTC) was dissolved in 100 mL acetone and added to the reaction mixture. The reaction mixture was stirred overnight. A white solid precipitated out of the bright yellow solution. Acetone was removed via rotary-evaporation, and the crude product was partitioned between 250 mL DI water and 250 mL hexane. The hexane layer was separated out and the aqueous layer was extracted with hexane (3×200 mL). All organic layers were combined, washed with brine (250 mL) and dried over $Na_2SO_4$. The crude product in hexane was passed over a silica gel plug to remove cloudiness. Hexane was removed via rotary-evaporation leaving the product S-hexyl-S'-4-(2-(n-butylpolydimethylsiloxysilyl)ethyl)benzyl carbonotrithioate (XG1996HTTC) in the form of a clear yellow oil. $^1$H NMR (300 MHz, $CDCl_3$): δ (ppm) 0.00-0.05 (m, 60H), 0.52 (t, 2H), 0.83-0.91 (m, 8H), 1.22-1.44 (m, 10H), 1.63-1.73 (m, 2H), 2.61 (t, 2H), 3.34 (t, 2H), 4.56 (s, 2H), 7.14 (d, 2H), 7.21 (d, 2H)

Preparations 9-15

Synthesis of PVP-Based Non-Reactive Polysiloxane Terminated Hydrophilic Polymer NRPTHP Varied MW Series Via RAFT Polymerization A series of NVP-containing NRPTHPs at different molecular weights was prepared. For all compositions, the length of the silicone segment was held constant at 10-12 repeat units, i.e. all polymers were made from the same lot of XG1996XAN from Preparation 5. Several NVP: XG1996XAN ratios were used in order to target different degrees of polymerization of the hydrophilic polymer segment, including 25, 50, 100, 300, 500, 1000, and 2000.

Preparation of Polymerization Solutions:

Polymerization solutions were prepared using the following procedure and components, in the amounts listed in Table 10, below. Distilled NVP was added to an amber 120 mL glass jar. Next, D3O, XG1996XAN, and Irgacure-819 were added to the monomer and warmed and stirred to ensure homogeneity. The amber jars containing the final polymerization solutions were placed in an $N_2$ atmosphere and purged for 20 minutes with $N_2$ to remove $O_2$ from the solution. The jar was sealed and placed in an $N_2$ glove-box until use.

While under nitrogen, each polymerization solution was poured into a 190 mm diameter crystallization dish, which was then placed on a reflective glass surface. The polymerization solution was cured under an $N_2$ atmosphere with 4 standard Phillips TL 20 W/03 RS bulbs at intensity of 2.0 mW/cm2 for 1 hour.

After curing for 1 hour, the resulting viscous polymerized material was poured into a separation funnel with a stopcock with a large aperture. A small amount of ethanol was used to rinse out the crystallization dish. The polymer solution was added drop-wise to vigorously stirring diethyl ether to precipitate product. One 2 L flask filled with 1800 mL of ether was used. The precipitated polymer was dried in vacuo for several hours and then subjected to further purification via Soxhlet extraction for two days with diethyl ether (the 25 DP polymer was too fine for Soxhlet extraction, so it was washed with another 1800 mL of ether). The polymers were analyzed for MW and MWD via SEC-MALLS, described below.

SEC-MALLS Characterization of Preparations 9 and 10:

The SEC-MALLS setup employed an organic co-eluent composed of 70% n-Propanol and 30% N-methylpyrrolidone at a flow rate of 0.75 mL/min at 40° C., Jordi Gel DVB 10000 Å (300×7.8 mm) with an online Agilent 1200 UV/vis diode array detector, Wyatt Optilab rEX interferometric refractometer, and a Wyatt miniDAWN Treos multiangle laser light scattering (MALLS) detector (λ=658 nm). The dη/dc values of 0.106 and 0.094 mL/g at 30° C. (λ=658 nm) for the PVP NRPTHPs of Preparations 9-15 and the polyDMA NRPTHPs of Preparations 19-21, respectively, were used for absolute molecular weight determination. Absolute molecular weights and polydispersity data were calculated using the Wyatt ASTRA V SEC/LS software package.

The results are shown in Table 11, below.

TABLE 11

| Prep # | Sample Type | Mn (g/mole) | Mw (g/mole) | PDI |
|---|---|---|---|---|
| 9 | PVP-Sil | 5,109 | 5,743 | 1.12 |
| 10 | PVP-Sil | 8,910 | 10,108 | 1.13 |
| 11 | PVP-Sil | 15,997 | 18,917 | 1.18 |
| 12 | PVP-Sil | 33,830 | 45,330 | 1.34 |
| 13 | PVP-Sil | 59,027 | 80,057 | 1.36 |
| 14 | PVP-Sil | 80,260 | 113,833 | 1.42 |
| 15 | PVP-Sil | 88,550 | 128,833 | 1.45 |

TABLE 10

| Prep# | 9 | 10 | 11 | 12 | 13 | 14 | 15 |
|---|---|---|---|---|---|---|---|
| Target Degree of polymerization | 25 | 50 | 100 | 300 | 500 | 1000 | 2000 |
| Materials | (g) | (g) | (g) | (g) | (g) | (g) | (g) |
| XG-1996-XAN | 18.02 | 9.01 | 4.50 | 3.0 | 0.901 | 0.450 | 0.225 |
| NVP | 50.0 | 50.0 | 50.0 | 100 | 50.0 | 50.0 | 50.0 |
| CGI-819 | 1.51 | 0.754 | 0.377 | 0.251 | 0.075 | 0.038 | 0.019 |
| D3O | 50.0 | 50.0 | 50.0 | 0 | 50.0 | 50.0 | 50.0 |
| n-pentanol | 0 | 0 | 0 | 10 | 0 | 0 | 0 |

Preparations 16-18

Synthesis of PVP-Based Non-Reactive Polysiloxane Terminated Hydrophilic Polymer NRPTHP Varied MW Series Via Conventional Free Radical Polymerization A series of PVP-containing NRPTHPs having different molecular weights was prepared using the following procedure.

1.68 g (6 mmol) of 4,4'-azobis(4-cyanovalearic acid) and 1.83 g (15 mmol) of 4-dimethyl amino pyridine, 3.0 g (15 mmol) of N,N-dicyclohexyl carbodiimide, and 40 mL of acetone were placed in a 200 mL three mouth flask equipped with a calcium chloride tube under nitrogen gas flow. 8.58 g (9 mmol) of polydimethylsiloxane having a hydroxyl group at one end and expressed by formula (a1)

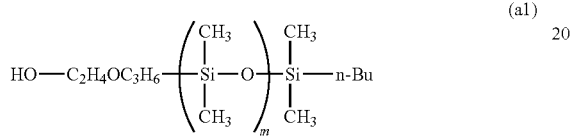

(a1)

(manufactured by Chisso Corporation FM-0411, Mw 1000) was added by drops to the solution and agitated for six hours at room temperature. A precipitated solid was filtered out, hexane was added to the filtrate obtained, and then the filtrate was washed two times with 0.5 N HCl, two times with saturated sodium bicarbonate aqueous solution, and one time with saturated sodium chloride aqueous solution. The organic phase was dried using sodium sulfate, filtered, and then concentrated to obtain crude product. The crude product, the macroinitiator expressed by Formula (a2)

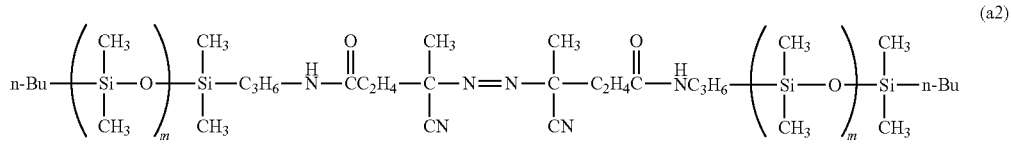

(a2)

was purified using a silica gel column (silica gel 180 g, hexane/ethyl acetate=100/0→10/1 (v/v), 400 mL each), and 5.18 g of the target silicone macro initiator was obtained.

NVP, the silicone macroinitiator expressed by (a5) (Mw of silicone portion is 1000, 0.15 g, 0.07 mmol), and t-amyl alcohol (TAA), in the amounts shown in Table 12 were added to a 200 mL three mouth flask, and then a three way cock, thermometer, and mechanical stirrer were attached.

The inside of the three mouth flask was evacuated using a vacuum pump and then substituted with argon, three times, and then the temperature was increased to 70° C. After confirming that the temperature had stabilized and heat generation was not occurring, the temperature was increased to 75° C. and the sample was agitated for 6 hours.

After polymerization was complete, the temperature was cooled to room temperature, and then the sample was poured into n-hexane/ethanol=600 mL/20 mL and allowed to sit. The supernatant fluid was removed by decanting, and then the washing was performed 2 times using n-hexane/ethanol=500 mL/20 mL. The solid fraction obtained was dried for 16 hours at 40° C. in a vacuum dryer, and then liquid nitrogen was added, the sample was crushed using a spatula, and then transferred to a bag with a zipper. Drying was performed for 3 hours at 40° C. using a vacuum dryer to obtain a block copolymer. The molecular weight of the block copolymer obtained was as shown in Table 12.

TABLE 12

| Ex# | NVP (g) | MI (g) | TAA (g) | Mn (kD) | Mw (kD) |
|---|---|---|---|---|---|
| 16 | 29.56 | 0.19 | 69.42 | 177 | 347 |
| 17 | 19.45 | 0.15 | 445.73 | 160 | 300 |
| 18 | 31.3 | 0.15 | 72.92 | 139 | 300 |

Preparations 19-21

Synthesis of PDMA-Based Non-Reactive Polysiloxane Terminated Hydrophilic Polymer NRPTHP Varied MW Series Via RAFT Polymerization in the Presence of XG1996TTC A series of DMA-containing NRPTHPs having different molecular weights was prepared using the procedure used for Preparations 9-15 (including the cure and purification procedures) and the components in the amounts listed in Table 13, below. For all preparations, the length of the silicone segment was held constant at 10-12 repeat units, i.e. all polymers were made from the same lot of XG1996HTTC from Preparation 5. Three ratios of DMA:XG1996HTTC ratios were targeted in order to vary the molecular weight of the hydrophilic polymer, including 300, 600, and 1000. The polymers were analyzed for MW and MWD via SEC-MALLS, described below. The results are shown in Table 14, below.

TABLE 13

| | Preparation# | | |
|---|---|---|---|
| | 19 | 20 | 21 |
| | | DP | |
| Materials | 300 (g) | 600 (g) | 1000 (g) |
| XG1996HTTC | 9.67 | 0.58 | 0.290 |
| DMA | 250.0 | 30.0 | 25.0 |
| CGI-819 | 0.176 | 0.0021 | 0.0053 |
| D3O | 0.0 | 30.0 | 25.0 |
| Pentanol | 250.0 | 0 | 0.0 |

TABLE 14

| Prep# | Sample Type | Mn (g/mole) | Mw (g/mole) | PDI |
|---|---|---|---|---|
| 19 | PDMA-Sil | 23,720 | 27,790 | 1.17 |
| 20 | PDMA-Sil | 44,830 | 49,480 | 1.10 |
| 21 | PDMA-Sil | 92,180 | 102,700 | 1.11 |

Examples 34-43

Figure 2:
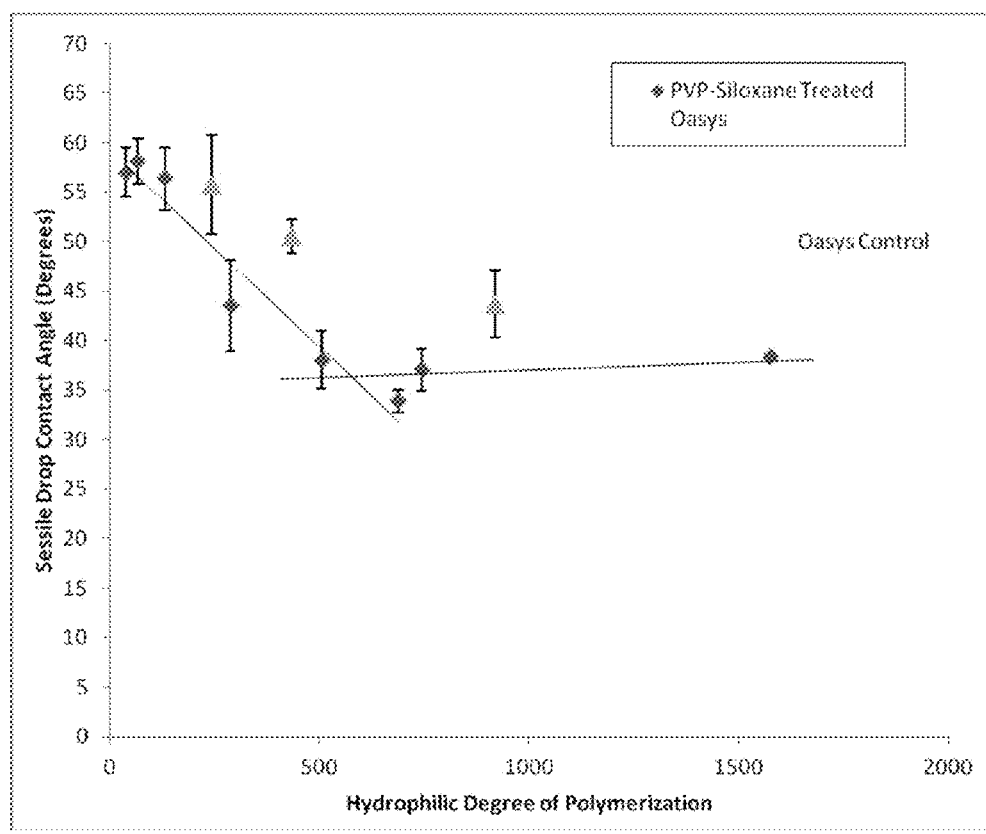
FIG. 2 is a graph showing the lipid uptake v. hydrophilic degree of polymerization for Examples 34-46.
Figure 3:
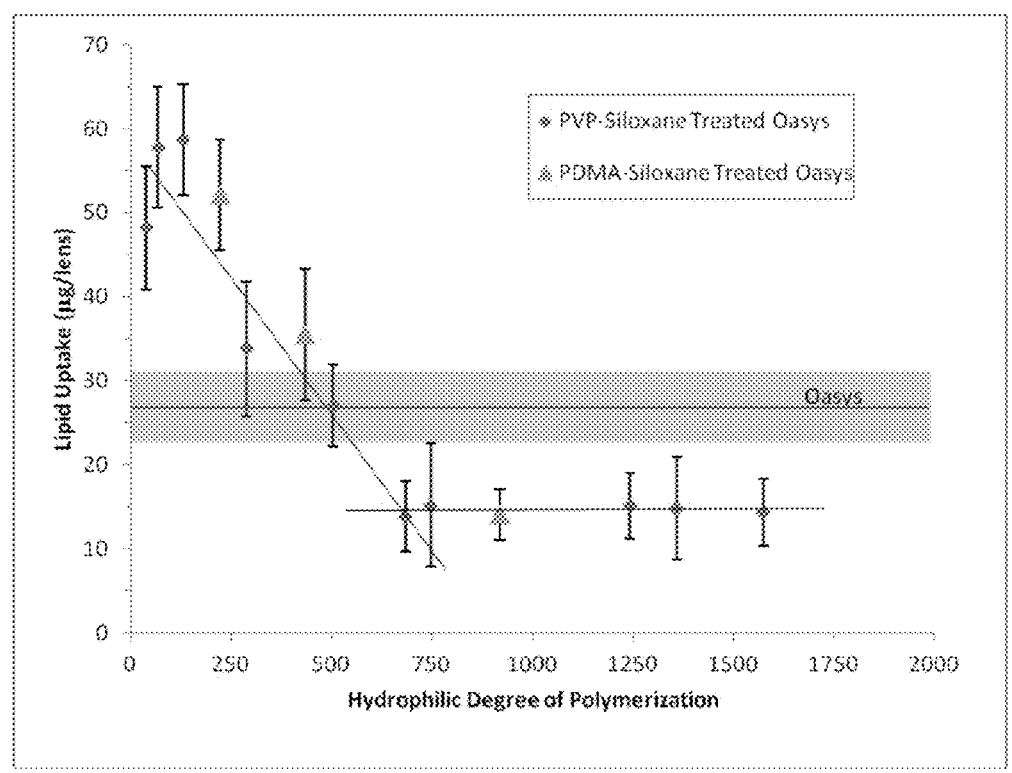
FIG. 3 is a graph showing the lipid uptake v. hydrophilic degree of polymerization for Examples 34-46.

Example 32 was repeated, but adding 2000 ppm of the NRPTHP of Preparations 9-18. The contact angles for the lenses were measured using the sessile drop method and lipid uptake was measured. The degree of polymerization, DP of the NRPTHP, lipid uptake and contact angle for each lens are shown in Table 15, below, (along with the control, ACUVUE OASYS contact lenses which were not soaked in an NRPTHP). The contact angle and lipid uptake results are shown graphically at FIGS. 2 and 3, respectively.

TABLE 15

| Ex# | Polymer Type | DP | Lipid Uptake (μg/lens) | Contact Angle (Degrees) |
|---|---|---|---|---|
|  | Oasys Control | NA | 28.2 (4.0) | 53.3 (1.4) |
| 34 | PVP-Sil-5K | 38 | 48.2 (7.4) | 57.0 (2.5) |
| 35 | PVP-Sil-9K | 66 | 57.8 (7.2) | 58.1 (2.3) |
| 36 | PVP-Sil-16K | 131 | 58.7 (6.7) | 56.3 (3.2) |
| 37 | PVP-Sil-34K | 288 | 33.8 (8.1) | 43.5 (4.6) |
| 38 | PVP-Sil-59K | 505 | 27.0 (4.9) | 38.1 (2.9) |
| 39 | PVP-Sil-80K | 688 | 13.8 (4.2) | 33.9 (1.1) |
| 40 | PVP-Sil-89K | 744 | 15.2 (7.3) | 37.1 (2.1) |
| 41 | PVP-Sil-139K | 1,243 | 15.1 (3.9) | 57 (6) |
| 42 | PVP-Sil-152K | 1,362 | 14.8 (6.2) | 69 (6) |
| 43 | PVP-Sil-176K | 1,575 | 14.4 (4.0) | 38.3 (0.32) |
| 44 | PDMA-Sil-23K | 222 | 52.1 (6.6) | 55.7 (5.0) |
| 45 | PDMA-Sil-44K | 434 | 35.5 (7.8) | 50.5 (1.7) |
| 46 | PDMA-Sil-92K | 918 | 14.1 (3.0) | 43.7 (3.4) |

Preparation 22

Synthesis of 3-acrylamidopropanoic acid (ACA1)

A fresh solution of sodium methoxide was prepared by dissolving 4.6 g of metallic sodium in 250 mL of stirred methanol, to which, Beta-alanine (3-aminopentanoic acid, 8.9 g, 0.1 mole) was added.

Acryloyl chloride (10.0 g, 1.1 eq.) was added dropwise to a stirred suspension of the given mixture, while maintaining the temperature below 35 C at all times. The mixture was stirred for an additional 30 minutes, concentrated to about 50 mL and filtered to remove the sodium chloride formed.

An aqueous solution of the hygroscopic material was acidified to pH 3 with aqueous HCl. Evaporation of the volatiles, followed by filtration through silica gel using 3-5% (v/v) methanol in ethyl acetate gave the desired 3-acrylamidpropanoinic acid.

Preparation 23

Synthesis of 5-acrylamidopentanoic acid (ACA2)

A fresh solution of sodium methoxide was prepared by dissolving 5.76 g of metallic sodium in 250 mL of stirred methanol. Valeric acid (5-aminopentanoic acid, 14.68 g, 0.125 mole) was dissolved in the given solution and 2.1 g of sodium carbonate was added to the mixture. Acryloyl chloride (12.31 g, 1.1 eq.) was added dropwise to a stirred suspension of the given mixture, while maintaining the temperature below 35° C. at all times. The mixture was stirred for an additional 30 minutes and filtered to remove the sodium chloride and residual carbonate present.

Evaporation of the methanol and other volatiles at reduced pressure, followed by washing the residue with 2×75 mL of acetonitrile yielded 20.4 g of the sodium salt of 5-acrylamidopentanoic acid. The free carboxylic acid was obtained pure after acidification of an aqueous salt solution to pH 3 with HCl, evaporation of the residual water, followed by filtration through silica gel using 2-3% (v/v) methanol in ethyl acetate.

Preparation 24

Synthesis of Poly(DMA-Co-ACA2)-Based Non-Reactive Polysiloxane Terminated Hydrophilic Polymer NRPTHP in the Presence of XG1996TTC (30% Ionic)

DMA was obtained from Jarchem and further purified via vacuum distillation. XG1996TTC was prepared according to Preparation 8, above. Irgacure 819 was dissolved in D3O (10 mg/mL).

The polymerization solution was prepared by dissolving 1.1 g ACA2 in 3 mL of ethanol and 1.5 g DMA in an amber 20 mL glass vial. Next, 166 mg XG1996TTC, and 1.51 mg (151 ul of stock solution) Irgacure-819 were added to the monomer and warmed/stirred to ensure homogeneity (CTA to initiator ratio=20). The amber vial containing the final polymerization solution was sealed with a rubber septum and purged for 20 minutes with $N_2$ to remove $O_2$ from the solution. Finally the sealed jar was placed in an $N_2$ glovebox for storage.

The polymerization solution was cured under an $N_2$ atmosphere with 4 standard Phillips TL 20 W/03 RS bulbs at intensity of 2.0 mW/cm$^2$ for 45 minutes. Prior to curing, the polymerization solution was poured into an 80 mm diameter crystallization dish, which was then placed on a reflective glass surface.

After curing, the resulting highly viscous polymerized material was dissolved in 5 mL of ethanol. The solution was stirred then added drop-wise to vigorously stirring diethyl ether to precipitate product. A 500 mL flask filled with 200 mL of ether was used. The precipitated polymer was dried in vacuo for several hours. The polymer was analyzed for MW and MWD via SEC-MALLS. The degree of polymerization of the hydrophilic segment was about 300.

The reaction is shown below.

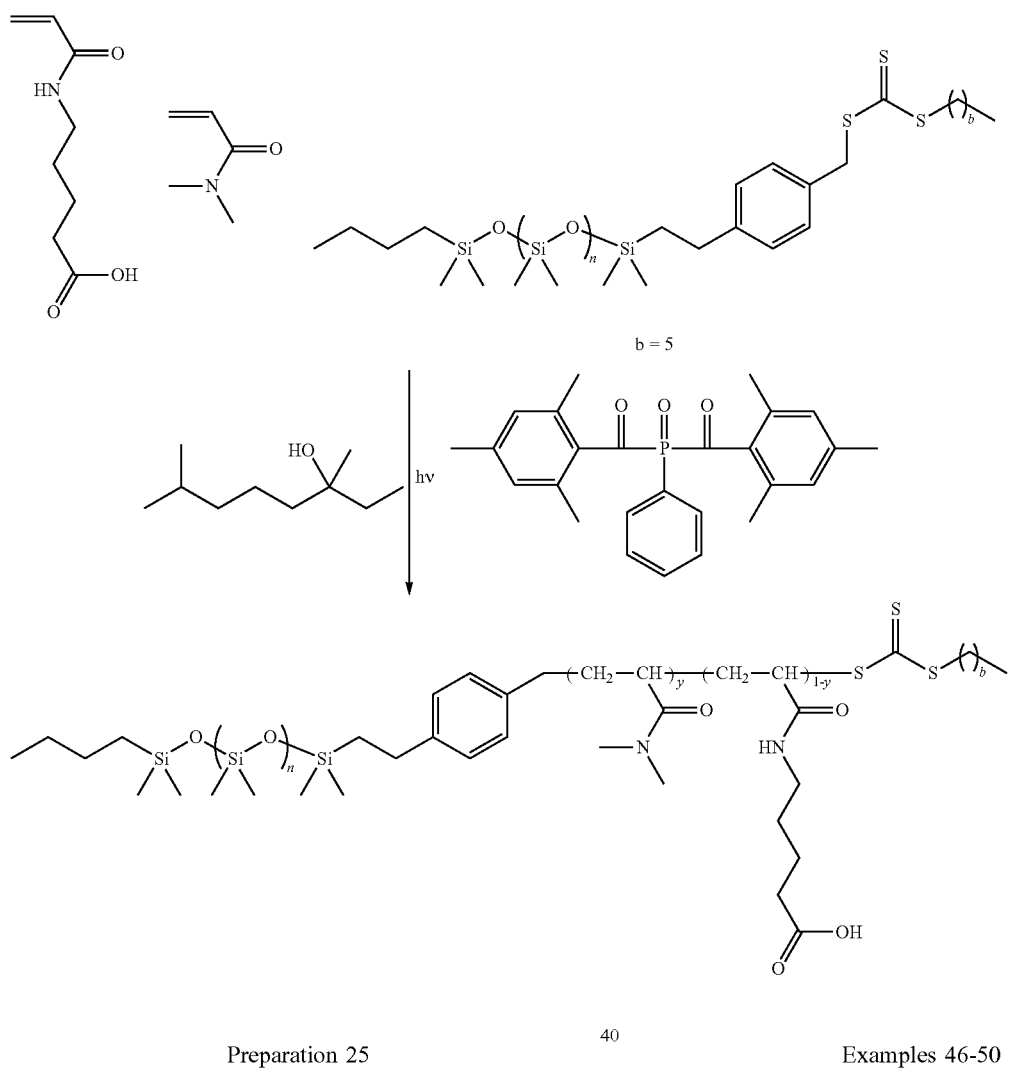

Preparation 25

Synthesis of Poly(DMA-Co-ACA2)-Based Non-Reactive Polysiloxane Terminated Hydrophilic Polymer NRPTHP in the Presence of XG1996TTC (80% Ionic)

DMA was purified via vacuum distillation. XG1996TTC was prepared according to Preparation 8. Irgacure 819, was obtained from Ciba Specialty Chemicals and dissolved in D3O (10 mg/mL).

The polymerization solution was prepared by dissolving 2.07 g ACA2 in 6 mL ethanol and 300 mg DMA in an amber 20 mL glass vial. Next, 58 mg XG1996TTC, and 1.06 mg (106 ul of stock solution) Irgacure-819 were added to the monomer and warmed/stirred to ensure homogeneity (CTA to initiator ratio=20). The amber vial containing the final polymerization solution was sealed with a rubber septum and purged for 20 minutes with $N_2$ to remove $O_2$ from the solution. Finally the sealed vial was placed in an $N_2$ glovebox for storage. The polymerization solution was cured and purified as described in Preparation 24. The polymer was analyzed for MW and MWD via SEC-MALLS. The degree of polymerization of the hydrophilic segment was about 300.

Examples 46-50

For each Example, three senofilcon lenses were removed from their packages and transferred glass vials containing packing solution containing the non-reactive polysiloxane terminated hydrophilic polymer ("NRPTHP") produced in Preparation 24 or 25 in the concentrations shown in Table 15. The lenses were re-packaged in the NRPTHP packing solution, autoclaved at 121° C. for 28 minutes and, after sterilization, were allowed to soak in the NRPTHP packing solution at ambient temperature for at least 24 hours. The contact angle, lysozyme uptake and PQ-1 uptake of the lenses were measured and are reported in Table 16. Untreated senofilcon lenses were also tested as a control.

TABLE 16

| Ex# | Prep | [NRPTHP] (ppm) | CA° | Lysozyme (ppm) | % PQ1 uptake |
|---|---|---|---|---|---|
| 45 | 24 | 50 | 24 ± 5 | 7 ± 1 | 19 ± 3 |
| 46 | 24 | 500 | 28 ± 6 | 0 ± 0 | 44 ± 7 |
| 47 | 24 | 1000 | 29 ± 7 | 0 ± 5 | 51 ± 6 |
| 48 | 25 | 50 | 24 ± 13 | 9 ± 0 | 33 ± 5 |
| 49 | 25 | 500 | 32 ± 18 | 24 ± 9 | 58 ± 7 |
| 50 | 25 | 1000 | 33 ± 16 | 46 ± 7 | 65 ± 4 |
| Cont. | | 0 | 70 + 6 | 0 ± 2 | 0 ± 2 |

The data in Table 16 shows that non-reactive hydrophilic copolymers having a siloxane segment greater than 6 and a hydrophilic segment having a degree of polymerization of about 300 are effective at reducing contact angle. The hydrophilic copolymer of Preparations 22 and 23 contained an anionic component, ACA2 which in the concentrations of Examples 46 through 48 were effective in increasing lysozyme uptake and decreasing PQ1 uptake. Lysozyme is a protein native to the eye which, when uptaken in a contact lens in the native form, is believed to improve the biocompatibility of the contact lens. PQ1 is a preservative commonly used in contact lens multipurpose solutions. Uptake of PQ1 to a contact lens in amounts greater than about 10% can cause staining and is therefore undesirable. The lenses of Examples 46-48 display a desirable balance of contact angle, lysozyme and PQ1 uptake.

Preparation 26

1.68 g (6 mmol) of 4,4'-azobis(4-cyanovalearic acid) and 1.83 g (15 mmol) of 4-dimethyl amino pyridine, 3.0 g (15 mmol) of N,N-dicyclohexyl carbodiimide, and 40 mL of acetone were placed in a 200 mL three mouth flask equipped with a calcium chloride tube under nitrogen gas flow. 8.58 g (9 mmol) of polydimethylsiloxane having a hydroxyl group at one end and expressed by the following formula (a2)

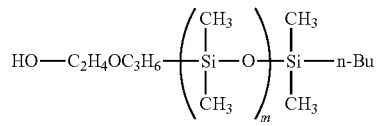

(manufactured by Chisso Corporation FM-0411, Mw 1000) was added by drops to the solution and agitated for six hours at room temperature. A precipitated solid was filtered out, hexane was added to the filtrate obtained, and then the filtrate was washed two times with 0.5 N HCl, two times with saturated sodium bicarbonate aqueous solution, and one time with saturated sodium chloride aqueous solution. The organic phase was dried using sodium sulfate, filtered, and then concentrated to obtain crude product. The crude product was purified using a silica gel column (silica gel 180 g, hexane/ethyl acetate=100/0→10/1 (v/v), 400 mL each), and 5.18 g of the target silicone macro initiator was obtained.

Preparation 27

1.40 g (5 mmol) of 4,4'-azobis(4-cyanovalearic acid), 9.1 g (9.1 mmol) of polydimethylsiloxane (manufactured by Chisso Corporation, FM0311, Mw 1000), 0.67 g (5.5 mmol) of 4-dimethyl aminopyridine, and 50 mL of acetone were added to a 200 mL three mouth flask equipped with a calcium chloride tube under nitrogen gas flow.

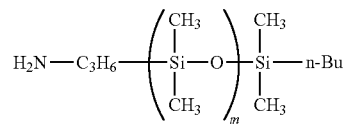

1.70 mL (11 mmol) of N,N-diisopropyl carbodiimide was added by drops to this blended solution. After agitating for 6 hours at ambient temperature, a precipitated solid was filtered out, hexane was added to the filtrate obtained, and then the filtrate was washed two times with 0.5 N HCl, two times with saturated sodium bicarbonate aqueous solution, and one time with saturated sodium chloride aqueous solution. The organic phase was dried using sodium sulfate, filtered, concentrated, and then the crude product was purified using a silica gel column (silica gel 180 g, hexane/ethyl acetate=10/1→3/1→2/1, 300 mL each), and 1.89 g of the target silicone macro initiator was obtained.

Preparation 28

The silicone macro initiator wherein the molecular weight of the silicone portion is 5000 was obtained by using the same method as Working Example 1 except that the polydimethylsiloxane containing a hydroxyl group on one end (a2) was replaced a polydimethylsiloxane of the same structure, but having a higher molecular weight (manufactured by Chisso Corporation, FM-0421, Mw 5000). The resulting silicone macroinitiator was purified as described in Working Example 1.

Preparation 29

The silicone macro initiator wherein the molecular weight of the silicone portion is 10,000 was obtained by the same method as Working Example 1 except that the polydimethylsiloxane containing a hydroxyl group on one end (a2) was replaced a polydimethylsiloxane of the same structure, but having a higher molecular weight (manufactured by Chisso Corporation, FM-0425, Mw 10,000), and then purifying.

Example 50

N-vinyl pyrrolidone (NVP, 29.56 g, 0.266 mol), the silicone macro initiator expressed by the following formula (a4) obtained by working example 1 (Mw of silicone portion is 1000, 0.19 g, 0.0866 mmol), and t-amyl alcohol (TAA, 69.42 g) were added to a 200 mL three mouth flask, and then a three way cock, thermometer, and mechanical stirrer were attached.

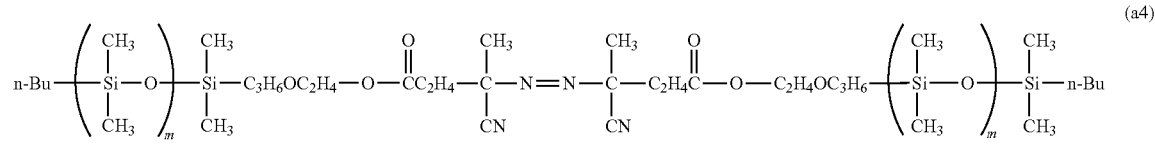

The inside of the three mouth flask was evacuated using a vacuum pump and then substituted with argon, three times, and then the temperature was increased to 70° C. After confirming that the temperature had stabilized and heat generation was not occurring, the temperature was increased to 75° C. and the sample was agitated for 6 hours.

After polymerization was complete, the temperature was cooled to room temperature, and then the sample was poured into n-hexane/ethanol=500 mL/40 mL and allowed to sit. The supernatant fluid was removed by decanting, and then the washing was performed 2 times using n-hexane/ethanol=500 mL/20 mL. The solid fraction obtained was dried for 16 hours at 40° C. in a vacuum dryer, and then liquid nitrogen was added, the sample was crushed using a spatula, and then transferred to a bag with a zipper. Drying was performed for 3 hours at 40° C. using a vacuum dryer to obtain a block copolymer. The molecular weight of the block copolymer obtained was as shown in Table 18.

Working Examples 51 Through 57

Additional block copolymers were formed according to the procedure of Example 50, but with the components in the amounts indicated in Table 17. The molecular weight of each of the block copolymers obtained was as shown in Table 18.

Working Example 58

N-vinyl pyrrolidone (NVP, 31.12 g, 0.28 mol), the silicone macro initiator expressed by the following formula (a5) obtained by Working Example 1 (Mw of silicone portion is 1000, 0.15 g, 0.07 mmol), and t-amyl alcohol (TAA, 72.96 g) were added to a 200 mL three mouth flask, and then a three way cock, thermometer, and mechanical stirrer were attached.

Comparative Example 6

Polymerization was performed by the same method as Example 50, except that the polymerization initiator was substituted with the silicone macroinitiator of Preparation 28 (molecular weight (Mw) of the silicone portion 5000), and the amounts of the components used were as indicated in Table 17. The molecular weight of the block copolymer obtained was as shown in Table 18.

Comparative Example 7 and 8

Polymerization was performed by the same method as Example 50, except that the polymerization initiator was substituted with a silicone macroinitiator of Preparation 29 (molecular weight (Mw) of the silicone portion 10,000), and the amounts of the components used were as indicated in Table 17. The molecular weight of the block copolymer obtained using the following conditions:

(1) GPC Measurement

GPC measurement was performed at the following conditions.
Equipment: Tosoh Corporation
Column: TSKgel SUPER HM_H, 2 columns (particle diameter; 5 μm, 6.0 mm ID×15 cm)
Mobile phase: N-methyl pyrrolidone (10 mM LiBr)
Column temperature: 40° C.
Measurement time: 40 minutes
Injection quantity: 10 μL
Detector: RI detector

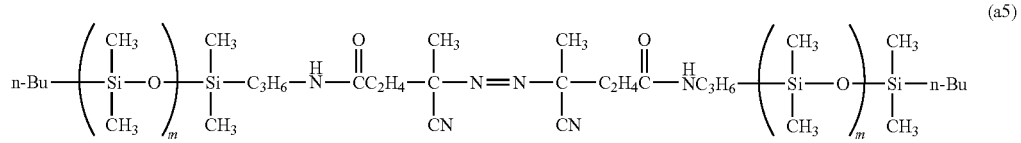

(a5)

The inside of the three mouth flask was evacuated using a vacuum pump and then substituted with argon, three times, and then the temperature was increased to 70° C. After confirming that the temperature had stabilized and heat generation was not occurring, the temperature was increased to 75° C. and the sample was agitated for 6 hours.

After polymerization was complete, the temperature was cooled to room temperature, and then the sample was poured into n-hexane/ethanol=600 mL/20 mL and allowed to sit. The supernatant fluid was removed by decanting, and then the washing was performed 2 times using n-hexane/ethanol=500 mL/20 mL. The solid fraction obtained was dried for 16 hours at 40° C. in a vacuum dryer, and then liquid nitrogen was added, the sample was crushed using a spatula, and then transferred to a bag with a zipper. Drying was performed for 3 hours at 40° C. using a vacuum dryer to obtain a block copolymer. The molecular weight of the block copolymer obtained was as shown in Table 18.

Examples 59-60

Additional block copolymers were formed according to the procedure of Example 58, but with the components in the amounts indicated in Table 17. The molecular weight of the block copolymer obtained was as shown in Table 18.

Flow rate: 0.2 mL/minute
Sample concentration: 0.4 weight %
Standard sample: polystyrene (molecular weight 500 to 1.09 million)

The results are shown in Table 18.

TABLE 17

| Working Ex.# | NVP (g) | macro-initiator Ex# | (g) | TAA (g) | Mn (kD) | Mw (kD) |
|---|---|---|---|---|---|---|
| 50 | 29.56 | 26 | 0.19 | 69.42 | 113.3 | 293.9 |
| 51 | 24.62 | 26 | 0.19 | 24.81 | 132.0 | 509.0 |
| 52 | 25.9 | 26 | 0.19 | 39.15 | 148.5 | 505.0 |
| 53 | 15.54 | 26 | 0.2 | 36.9 | 48.5 | 135.4 |
| 54 | 31.07 | 26 | 0.1 | 72.73 | 78.4 | 189.2 |
| 55 | 5.18 | 26 | 0.1 | 29.92 | 42.7 | 93.8 |
| 56 | 19.45 | 26 | 0.15 | 45.73 | 88.7 | 251.6 |
| 57 | 31.10 | 26 | 0.15 | 72.92 | 70.9 | 198.1 |
| 58 | 31.12 | 27 | 0.15 | 72.96 | 80.0 | 228.8 |
| 59 | 23.34 | 27 | 0.15 | 35.24 | 103.1 | 353.7 |
| 60 | 23.34 | 27 | 0.15 | 23.49 | 114.6 | 406.8 |
| CE6 | 15.34 | 28 | 0.46 | 36.87 | 69.9 | 183.9 |
| CE7 | 16.67 | 29 | 1.0 | 41.23 | 68.69 | 172.39 |
| CE8 | 44.46 | 29 | 1.0 | 106.1 | 67.96 | 166.94 |

Working Example 14

The block copolymers obtained by Examples 50 through 55 and 58 through 60, as well as Comparative Examples 6 through 8 were dissolved at a concentration of 2000 ppm in packaging solutions. The transmissivity of the solutions obtained was measured and are shown in Table 18.

TABLE 18

| Ex# | Silicone portion Mw | Block copolymer Mn (kD) | Block copolymer Mw (kD) | Transmissivity (%) | Transparency |
|---|---|---|---|---|---|
| 50 | 1000 | 113.3 | 293.9 | 97.37 | Transparent |
| 51 | 1000 | 132.0 | 509.0 | 96.97 | Transparent |
| 52 | 1000 | 148.5 | 505.0 | 96.38 | Transparent |
| 53 | 1000 | 48.5 | 135.4 | 97.76 | Transparent |
| 54 | 1000 | 78.4 | 189.2 | 96.74 | Transparent |
| 55 | 1000 | 42.7 | 93.8 | 93.65 | Transparent |
| 58 | 1000 | 80.0 | 228.8 | 98.57 | Transparent |
| 50 | 1000 | 103.1 | 353.7 | 98.38 | Transparent |
| 60 | 1000 | 114.6 | 406.8 | 97.30 | Transparent |
| CE3 | 5000 | 69.9 | 183.9 | 91.39 | White cloudy |
| CE4 | 10,000 | 68.69 | 172.39 | 78.63 | White cloudy |
| CE5 | 10,000 | 67.96 | 166.94 | 89.38 | White cloudy |

As shown in Table 18, the copolymers of Examples 50 through 55 and 58-60 all formed transparent solutions, even at 2000 ppm. When the molecular weight of the siloxane segment was above about 5000 (Comparative Examples 6 through 8) the transmissivity of the 2000 ppm solution was reduced and a clear solution could not be obtained.

We claim:

1. A composition comprising at least one stable, near-monodisperse, non-reactive hydrophilic polymer comprising in said polymer's backbone, a hydrophilic segment having a degree of polymerization of about 300 to about 10,000, and a linear silicone segment on at least one terminal end of said non-reactive hydrophilic polymer, wherein said silicone segment comprises between about 6 and about 200 siloxy units, and said non-reactive hydrophilic polymer is associated, via the linear silicone block with a silicone hydrogel, wherein said polymer has a polydispersity of less than about 1.5.

2. The composition of claim 1 wherein said hydrophilic segment of said non-reactive hydrophilic polymer has a degree of polymerization between about 500 and about 10,000.

3. The composition of claim 1 wherein said hydrophilic segment of said non-reactive hydrophilic polymer has a degree of polymerization between about 500 and about 5000.

4. The composition of claim 1 wherein said hydrophilic segment of said non-reactive hydrophilic polymer has a degree of polymerization between about 500 and about 2000.

5. The composition of claim 1 wherein hydrophilic segment and linear silicone segment are present in said non-reactive hydrophilic polymer in a ratio, based upon the degree of polymerization, between 13:1 and 500:1.

6. The composition of claim 5 wherein the ratio of hydrophilic segment to linear silicone segment, based upon degree of polymerization, is between 30:1 and 200:1.

7. The composition of claim 5 wherein the ratio of hydrophilic segment to linear silicone segment, based upon degree of polymerization is between 70:1 and 200:1.

8. The composition of claim 1 wherein said hydrophilic segment is linear or branched.

9. The composition of claim 1 wherein said silicone segment comprises polydialkylsiloxane, polydiarylsiloxane and mixtures thereof.

10. The composition of claim 9 wherein said alkyl is selected from $C_1$-$C_4$ alkyl.

11. The composition of claim 9 wherein said polydialkylsiloxane comprises polydimethylsiloxane or polydiethylsiloxane.

12. The composition of claim 1 wherein said hydrophilic segment is formed from monomers selected from the group consisting of vinyl amides, vinyl lactones, vinylimides, vinyl lactams, hydrophilic (meth)acrylates, (meth)acrylamides and mixtures thereof.

13. The composition of claim 1 wherein said non-reactive hydrophilic polymer is formed by
(a) Reacting a hydroxyl alkyl terminated polydialkylsiloxane with 4-(bromomethyl)benzoyl bromide in the presence of at least one hindered non-nucleophilic amine and subsequently reacting a thiocarbonylthio anion to form a polysiloxane-functional RAFT agent having a silicone segment and a dithio compound on one terminus of said silicone segment;
(b) Contacting the polysiloxane-functional RAFT agent with at least one hydrophilic monomer, a free radical initiator, and an optional solvent; and
(c) Polymerizing said at least one hydrophilic monomer in the presence of the polysiloxane-functional RAFT agent to form a hydrophilic segment on the polysiloxane-functional RAFT agent, such that the dithio compound is on a terminal end of said hydrophilic segment and the silicone segment is on an opposite terminus.

14. The composition of claim 1 wherein said non-reactive hydrophilic polymer is formed by
(a) Reacting a silane-terminated polydialkylsiloxane with 1-(chloromethyl)-4-vinylbenzene in the presence of a catalyst and subsequently reacting a thiocarbonylthio anion to form a polysiloxane-functional RAFT agent having a silicone segment and a dithio compound on one terminus of said silicone segment;
(b) Contacting the polysiloxane-functional RAFT agent with at least one hydrophilic monomer, a free radical initiator, and an optional solvent; and
(c) Polymerizing at least one hydrophilic monomer in the presence of the polysiloxane-functional RAFT agent to form a hydrophilic segment on the polysiloxane-functional RAFT agent, such that the dithio compound is on a terminal end of said hydrophilic segment and the silicone segment is on the opposite terminus.

15. A composition comprising at least one stable, near-monodisperse, non-reactive hydrophilic polymer comprising in said polymer's backbone, a hydrophilic segment having a degree of polymerization of about 300 to about 10,000, and a linear silicone segment on at least one terminal end of said non-reactive hydrophilic polymer, wherein said silicone segment comprises between about 6 and about 200 siloxy units, and said non-reactive hydrophilic polymer is associated, via the linear silicone block with a silicone hydrogel, wherein said polymer is a polymer of Formula I:

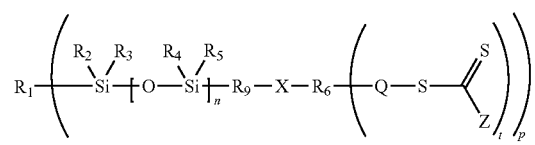

wherein $R_1$ is selected from substituted and unsubstituted $C_{1-24}$ alkyl;

$R_2$-$R_5$ are independently selected from H, $C_1$-$C_4$ alkyl and $C_{6-10}$ aryl;

n is 6-20;

$R_9$ is selected from a direct bond and $C_{1-12}$ alkylene;

X is selected from the group consisting of —O—(CO)—, —(CO)O—, —NR$_8$—(CO)—, —(CO)NR$_8$—, —O—, or a direct bond;

$R_8$ is selected from H, methyl, ethyl or propyl;

$R_6$ is selected from the group consisting of alkylenes of the following formulae:

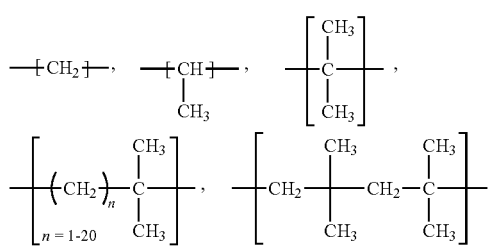

and aromatic groups of the following formulae:

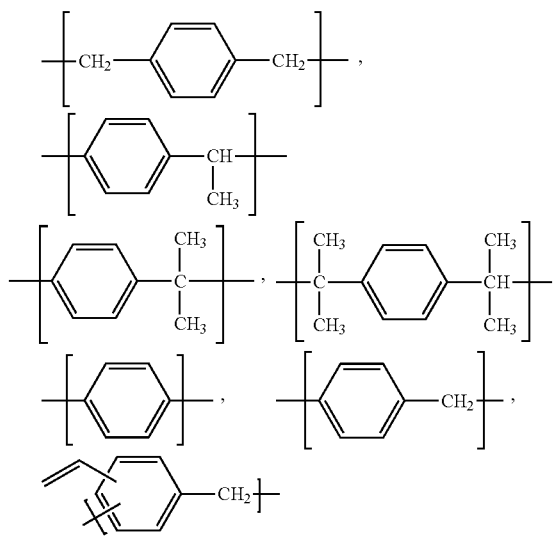

Q is the hydrophilic segment,

Z is selected from the group consisting of hydrogen, chlorine, fluorine, optionally substituted alkyl, optionally substituted aryl, optionally substituted heterocyclyl, optionally substituted alkylthio, optionally substituted alkoxy, optionally substituted alkoxycarbonyl, optionally substituted aryloxycarbonyl (—COOR"), carboxy (—COOH), optionally substituted acyloxy (—O$_2$CR"), optionally substituted carbamoyl (—CONR"$_2$), cyano (—CN), dialkyl- or diaryl-phosphonato [—P(=O)(OR")$_2$], dialkyl- or diaryl-phosphinato [—P(=O)(OR")$_2$];

t is 1 or an integer greater than 1 and p is an integer of 1-5.

16. The composition of claim 15 wherein $R_1$ is selected from the group consisting of substituted and unsubstituted $C_{1-10}$ alkyl;

$R_2$-$R_5$ are independently selected from $C_1$-$C_4$ alkyl, $R_6$ is selected from the group consisting aromatic groups of the following formulae:

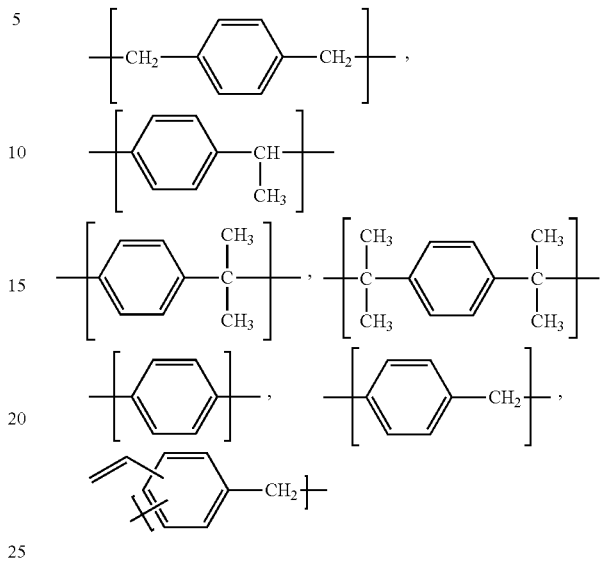

and n is 6-15.

17. The composition of claim 15 wherein $R_1$ is selected from the group consisting of substituted and unsubstituted $C_{1-4}$ alkyl and $R_2$-$R_5$ are methyl.

18. The composition of claim 15 wherein n is 6-12.

19. The composition of claim 15 wherein $R_1$ is selected from the group consisting of substituted and unsubstituted alkyl;

$R_2$-$R_5$ are independently selected from $C_1$-$C_4$ alkyl, $R_6$ is selected from the group consisting of alkylenes:

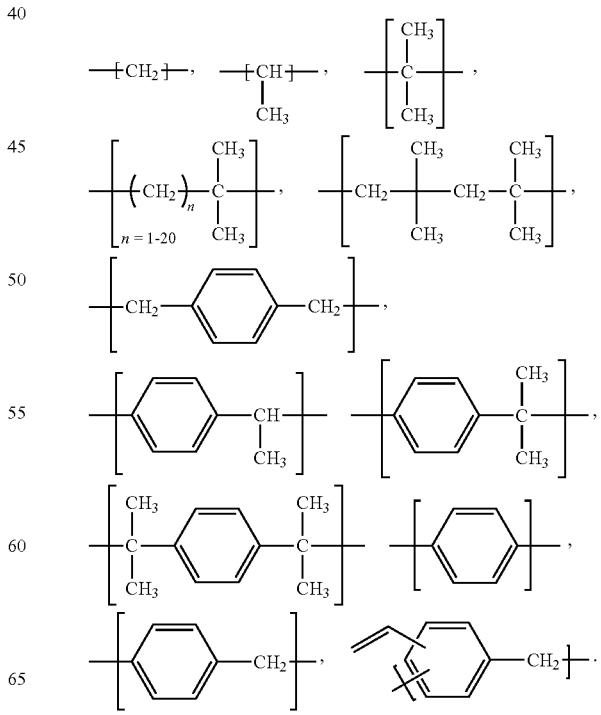

20. The composition of claim 15 wherein Z is selected from optionally substituted alkoxy, optionally substituted alkylthio, optionally substituted aryl, and optionally substituted benzyl.

* * * * *

UNITED STATES PATENT AND TRADEMARK OFFICE
CERTIFICATE OF CORRECTION

PATENT NO. : 9,815,979 B2
APPLICATION NO. : 15/343663
DATED : November 14, 2017
INVENTOR(S) : Scales et al.

Page 1 of 1

It is certified that error appears in the above-identified patent and that said Letters Patent is hereby corrected as shown below:

In Claim 19, Column 66, Lines 33-34:
Correct: "$R_1$ is selected from the group consisting of substituted and unsubstituted alkyl;"
To read: -- $R_1$ is selected from the group consisting of substituted and unsubstituted $C_{1-10}$ alkyl; --

Signed and Sealed this
Thirty-first Day of July, 2018

Andrei Iancu
*Director of the United States Patent and Trademark Office*